(12) United States Patent
Rozhnov

(10) Patent No.: US 12,284,199 B2
(45) Date of Patent: Apr. 22, 2025

(54) METHOD AND COMPUTING DEVICE FOR DETECTION OF MALICIOUS WEB RESOURCE

(71) Applicant: GROUP-IB GLOBAL PRIVATE LIMITED, Singapore (SG)

(72) Inventor: Ilia Rozhnov, Singapore (SG)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 277 days.

(21) Appl. No.: 18/079,058

(22) Filed: Dec. 12, 2022

(65) Prior Publication Data

US 2023/0262078 A1  Aug. 17, 2023

(30) Foreign Application Priority Data

Feb. 14, 2022  (SG) .............................. 10202201404S

(51) Int. Cl.
H04L 9/40  (2022.01)

(52) U.S. Cl.
CPC ...... *H04L 63/1425* (2013.01); *H04L 63/1416* (2013.01); *H04L 63/1433* (2013.01)

(58) Field of Classification Search
CPC ............. H04L 63/1425; H04L 63/1416; H04L 63/1433; H04L 9/40; H04L 63/1483; G06F 21/566
See application file for complete search history.

(56) References Cited

U.S. PATENT DOCUMENTS

| | | | | |
|---|---|---|---|---|
| 9,356,947 B2 * | 5/2016 | Shraim | ............... | H04L 63/1483 |
| 9,519,781 B2 * | 12/2016 | Golshan | ............... | G06F 21/566 |
| 9,521,162 B1 * | 12/2016 | Zand | ................... | H04L 63/1458 |

(Continued)

FOREIGN PATENT DOCUMENTS

| | | |
|---|---|---|
| KR | 101190261 B1 | 10/2012 |
| RU | 2523114 C2 | 7/2014 |

(Continued)

OTHER PUBLICATIONS

Search Report with regard to the NL Patent Application No. 2031256 completed Jan. 2, 2023.

(Continued)

*Primary Examiner* — Khalid M Almaghayreh
(74) *Attorney, Agent, or Firm* — BCF LLP

(57) ABSTRACT

A method and a computing device for identifying malicious web resource are provided. The method comprises: obtaining a given link of a plurality of links, the given link referring to an initial malicious web resource; retrieving, from a database, simulated user parameters indicative of a simulated user environment and at least one user behavior vector including values indicative of simulated user actions with the initial malicious web resource; based on the simulated user parameters and the simulated user actions, determining at least one redirect chain, a given one of the at least one redirect chain including web resources defining a transition sequence from the initial malicious web resource to a respective target malicious web resource; generating, based on the at least one redirect chain, a redirect graph; and analyzing the redirect graph to determine a plurality of user redirect rules for further use in identifying in-use malicious web resources.

22 Claims, 8 Drawing Sheets

(56) References Cited

U.S. PATENT DOCUMENTS

| | | | | |
|---|---|---|---|---|
| 9,531,736 | B1* | 12/2016 | Torres | H04L 67/02 |
| 9,813,310 | B1* | 11/2017 | Sieracki | H04L 43/18 |
| 11,005,779 | B2* | 5/2021 | Volkov | G06N 20/00 |
| 11,106,789 | B2* | 8/2021 | Kraus | H04L 63/1416 |
| 2008/0209552 | A1* | 8/2008 | Williams | G06F 21/6218 |
| | | | | 726/22 |
| 2010/0299292 | A1* | 11/2010 | Collazo | G06F 21/577 |
| | | | | 706/14 |
| 2014/0317741 | A1* | 10/2014 | Be'ery | H04L 63/16 |
| | | | | 726/23 |
| 2017/0085583 | A1* | 3/2017 | Torres | H04L 67/02 |
| 2017/0195353 | A1* | 7/2017 | Taylor | H04L 63/1425 |
| 2017/0286673 | A1* | 10/2017 | Lukacs | G06F 21/566 |
| 2018/0041530 | A1* | 2/2018 | Tang | H04L 63/1425 |
| 2018/0048673 | A1* | 2/2018 | Hunt | H04L 41/22 |
| 2020/0213347 | A1* | 7/2020 | Kalinin | G06F 21/56 |
| 2020/0374313 | A1* | 11/2020 | Manoselvam | G06N 20/00 |
| 2022/0224724 | A1* | 7/2022 | Bazalgette | G06F 21/554 |
| 2023/0403294 | A1* | 12/2023 | Bazalgette | H04L 63/1441 |

FOREIGN PATENT DOCUMENTS

| | | |
|---|---|---|
| RU | 2637477 C1 | 12/2017 |
| RU | 2668710 C1 | 10/2018 |
| RU | 2724800 C1 | 6/2020 |
| RU | 2744671 C2 | 3/2021 |

OTHER PUBLICATIONS

Search Report with regard to the counterpart RU Patent Application No. 2022105354 completed Dec. 1, 2022.
English Abstract for KR101190261 retrieved on Espacenet on Dec. 9, 2022.

* cited by examiner

METHOD AND COMPUTING DEVICE FOR DETECTION OF MALICIOUS WEB RESOURCE

CROSS-REFERENCE

The present application claims priority to a Singapore Patent Application No.: 10202201404S, filed on Feb. 14, 2022, and entitled "METHOD AND COMPUTING DEVICE FOR DETECTION OF TARGET MALICIOUS WEB RESOURCE", the content of which is incorporated by reference in its entirety.

FIELD

The present technology relates broadly to the field of information security, and specifically, to a computer-implementable method and a computing device for detecting malicious web resources.

BACKGROUND

A majority of cyberattacks is perpetrated on or using the Internet (e.g., malicious software distribution, phishing, etc.). Typically, to conduct the cyberattacks, the attackers bait their victims into going to malicious web resources (such as websites or web pages, for example).

The systems of the malicious web page identification currently known in the art can be divided into two categories. The first category uses static analysis methods for analyzing the web pages and their codes (e.g., HTML, CSS, JavaScript or Flash); in the process, a search is being performed for the malicious activity templates.

For example, such an approach is realized in the technology described in the U.S. Pat. No. 9,356,947-B2, issued on May 31, 2016, assigned to Opsec Online LTD, and entitled "METHODS AND SYSTEMS FOR ANALYZING DATA RELATED TO POSSIBLE ONLINE FRAUD". More specifically, this document discloses methods, systems and software for analyzing data. In particular embodiments, for example, a set of data about a web site may be analyzed to determine whether the web site is likely to be illegitimate (e.g., to be involved in a fraudulent scheme, such as a phishing scheme, the sale of gray market goods, etc.). In an exemplary embodiment, a set of data may be divided into a plurality of components (each of which, in some cases, may be considered a separate data set). Merely by way of example, a set of data may comprise data gathered from a plurality of data sources, and/or each component may comprise data gathered from one of the plurality of data source. As another example, a set of data may comprise a document with a plurality of sections, and each component may comprise one of the plurality of sections. Those skilled in the art will appreciate that the analysis of another component may comprise certain tests and/or evaluations, and that the analysis of another component may comprise different tests and/or evaluations. In other cases, the analysis of each component may comprise similar tests and/or evaluations. The variety of tests and/or evaluations generally will be implementation specific.

Also, Russian Patent No.: 2,668,710-C1 issued on Oct. 2, 2018, assigned to Group-IB TDS, LTD, and entitled "METHOD COMPUTING DEVICE FOR DETECTING MALICIOUS DOMAIN NAMES IN NETWORK TRAFFIC", discloses a method and computing device for detecting malicious domain names in network traffic. The method comprises: receiving the network traffic from a data network, extracting a plurality of data packets from the network traffic, analyzing the plurality of data packets in order to extract at least one domain name from the plurality of data packets; generating, for a given one of the at least one domain names, a given numerical value representative of a suspiciousness of the given one of the at least one domain name, the given numeric value being based on a given set of features of domain name suspiciousness corresponding to one of the given set of analysis methods; classifying the at least one domain name as malicious domain names, in response to an analysis being indicative the given domain name being a malicious domain name.

The second category of the systems for malicious page identification are configured for dynamic types of analysis based on circumvention of the suspicious web resources using special instruments (e.g., ACOOC or client honeypot) that are used to monitor web resources for signs of activity.

For example, Korea Patent No.: 101,190,261-B1, issued on Oct. 12, 2012, assigned to KOREA INTERNET & SECURITY AGENCY, and entitled "HYBRID INTERACTION CLIENT HONEYPOT SYSTEM AND ITS OPERATION METHOD", discloses an interaction client honeypot system, comprising: a web crawler for downloading a web page of a URL suspected of maliciousness; and a web browser for statically analyzing a web page downloaded by the web crawler to hide an iframe among HTML tags included in the web page If the length of the string exceeds 200 Byte, it is used as a malicious suspicious web page. If the string is obfuscated, it is analyzed as a malicious suspicious web page. Low Interaction Client Honeypot for downloading and analyzing web page of website; and a malicious code analyzing unit for analyzing maliciousness by analyzing a behavior of a web site after directly visiting a suspected malicious web site selected from the low interaction client honeypot, and a system initialization unit for initializing only the virtual file system unit after the analysis is completed, wherein the web crawler is configured to receive a response from a plurality of user agents and the analysis module includes an HTML tag analysis unit for analyzing a tag of an HTML document included in the web page, The HTML tag analysis unit and the Java Scope Hybrid interaction client honeypot system being analyzed through a bit negative results comprising selected parts of a malicious web page to select a suspected malicious web page

SUMMARY

It is an object of the present technology to ameliorate at least some of the inconveniences associated with the prior art.

Non-limiting embodiments of the present technology are directed to determining redirecting chain to identify the templates therein that are commonly encountered when interacting with the malicious web pages.

Certain non-limiting embodiments of the present technology are based on a premise that using redirections to several resources, the fraudsters can be capable of separating the use of the known brands web pages and of the actual fraudulent page. This complicates the blocking processes since if the target malicious web resource contains fewer violations, fewer policies and rules can be applied to it that grant the responsible organization rights to block the resource. Also, the use of several web resources allows the malefactors to limit the organizations reacting to such attacks in their ability to visit the target web resource, while giving the attackers the technical possibility to flexibly change any intermediate link within the chain without all the entry points renewal.

More specifically, in accordance with a first broad aspect of the present technology, there is provided a computer-implementable method for identifying target malicious web resources. The method is executable by a computing device including a processor. The method comprises: during a first stage: obtaining, by the processor, a given link of a plurality of links, the given link referring to an initial malicious web resource; retrieving, by the processor, from a database communicatively coupled to the processor, simulated user parameters indicative of a simulated user environment and at least one user behavior vector including values indicative of simulated user actions with the initial malicious web resource; based on the simulated user parameters and the simulated user actions, determining, by the processor, at least one redirect chain, a given one of the at least one redirect chain including web resources defining a transition sequence from the initial malicious web resource to a respective target malicious web resource; generating, by the processor, based on the at least one redirect chain, a redirect graph; and analyzing, by the processor, the redirect graph to determine a plurality of user redirect rules, a given user redirect rule including data of a respective transition from the initial malicious web resource towards the respective target malicious web resource associated with a respective simulated user action and at least some of the simulated user parameters; during a second stage following the first stage: obtaining, by the processor, from a user device, a given in-use link referring to a suspicious web resource; obtaining, by the processor, in-use parameters of the user device representative of an in-use user environment associated with the user device; determining, for the given in-use link, by the processor, based at least on the in-use parameters, in-use user redirect rules, a given in-use user redirect rule being representative of a respective transition from the suspicious web resource; determining, by the processor, if at least one in-use user redirect rule corresponds to any one of the plurality of user redirect rules to respective target malicious web resources; in response to determining that the at least one in-use user redirect rule corresponds to a given one of the plurality of user redirect rules: identifying, by the processor, the respective target malicious web resource associated with the given one of the plurality of user redirect rules; causing, by the processor, restriction of access to the respective target malicious web resource; and transmitting a notification to the user device warning about the respective target malicious web resource being malicious.

In some implementations of the method, the given link includes at least one of: a domain name, an IP address, and a URL address.

In some implementations of the method, the simulated user actions of the at least one user behavior vector comprises at least one of: following a link, entering data, selecting from suggested options.

In some implementations of the method, the simulated user parameters comprise parameters of a simulated user device further including at least one of: an IP address, geolocation data, a redirection time, information, a type of an operating system, an operating system interface language, a connection provider, a browser, a browser version, a browser interface language, cookie files, system time and actual time in the user device system, a url-referrer.

In some implementations of the method, the method further comprises retrieving additional information about each intermediary web resource identified in the given one of the at least one redirect chain, the additional information including at least one of: a URL link referring to a given intermediary web resource, an ID and other parameters within a body of the URL link; Detection time and date; geolocation data associated with the given intermediary web resource; Information about a hosting provider associated with the given intermediary web resource; an ID, an owner company name, and a brand name associated with the given intermediary web resource.

In some implementations of the method, the method further comprises considering all redirect chains, determined based on respective ones of the plurality of links, to generate the redirect graph, wherein a given redirect chain one of the redirect chains includes at least one of: a respective user behavior vector further including the simulated user parameters used for determining the given redirect chain, about each web resource contained therein, and about the sequence of the said web resources.

In some implementations of the method, the redirect graph comprises a plurality of nodes joined thereamong by edges, and wherein a given node is representative of a respective web resource, and a given edge is representative of a respective transition from one web resource to an other web resource.

In some implementations of the method, the generating the redirect graph comprises identifying affiliated web resources, the identifying being executed based on meeting at least one condition including: links to candidate affiliated web resources including URL addressees, domain names, page names, and parameter names, match; lengths of domain name, lengths of top-level domain name, lengths of page names and parameter names of the candidate affiliated web resources match; and IP addresses of the candidate affiliated web resources match.

In some implementations of the method, the affiliated web resources are represented by a single vertex of the redirect graph.

In some implementations of the method, the generating the redirect graph comprises comparing web resources among the redirect chains, and wherein: if matching web resources are identified in more than one chain, the method further comprises generating a single vertex representative of the matching web resources in the redirect graph; if a given web resource is different from all other web resources identified in the redirect chains, the method further comprises generating a respective new vertex for the given web resource in the redirect graph; and wherein if no edge exists in the redirect graph connecting the respective new vertex with previous vertices, the method further comprises generating a respective edge extending from the respective new vertex.

In some implementations of the method, the respective target malicious web resource is identified through additional checks thereof for malicious activities;

In some implementations of the method, the respective target malicious web resource is identified by analyzing an HTTP response codes obtained by a browser application.

In some implementations of the method, the method further comprises rejecting the given one of the at least one redirect chain from inclusion thereof in the redirect graph if the given one of the at least one redirect chain includes less than a pre-determined number of transitions between web resources contained therein.

In some implementations of the method, user behavior vectors are used both during the first stage and the second stage for determining respective redirect chains.

In some implementations of the method, the determining, for the given in-use link, the in-use redirect rules comprise: retrieving, by the processor, from the database, based on the in-use user parameters, an in-use user behavior vector including values indicative of at least one simulated user action with the given in-use link; and determining, by the processor, the in-use redirect rules based on the at least one simulated user action with the given in-use link.

In some implementations of the method, the method further comprises storing, by the processor, data indicative of the redirect graph in a redirect graph database communicatively coupled to the processor.

In some implementations of the method, the determining, for the given in-use link, the in-use redirect rules comprise: retrieving, by the processor, from the redirect graph database, data indicative of redirect graphs corresponding to the given in-use link; and determining, by the processor, the in-use rules based on the redirect graphs corresponding to the given in-use link.

In some implementations of the method, the given user redirect rule towards the respective target malicious web resource comprises data indicative of at least one of: conditions of the respective transition to a next web resource including the simulated user parameters; conditions of the respective transition to the next web resource including the simulated user actions; and conditions of the respective transition to the next web resource including both the simulated user parameters and the simulated user actions.

Further, in accordance with a second broad aspect of the present technology, there is provided a computer-implementable method for identifying malicious web resource. The method is executable by a computing device including a processor. The method comprises: obtaining, by the processor, from a user device, a given link referring to a suspicious web resource; obtaining, by the processor, parameters of the user device representative of a user environment associated with the user device; determining, by the processor, based on the parameters, at least one redirect chain, the at least one redirect chain including a plurality of web resources defining a transition sequence from the suspicious web resource; determining, by the processor, based on the at least one redirect chain, user redirect rules, a given user redirect rule of the plurality of user redirect rules being representative of a respective transition from the suspicious web resource; determining, by the processor, if at least one in-use user redirect rule corresponds to any one of a plurality of predetermined user redirect rules; in response to determining that the at least one user redirect rule corresponds to a given one of the plurality of predetermined user redirect rules: identifying, by the processor, a respective target malicious web resource associated with the given one of the plurality of predetermined user redirect rules; causing, by the processor, restriction of access, from the user device, to the respective target malicious web resource; and transmitting a notification to the user device warning about the respective target malicious web resource being malicious.

In accordance with a third broad aspect of the present technology, there is provided a computing device for identifying target malicious web resources. The computing device comprising a processor and non-transitory computer-readable medium storing instructions. The processor, upon executing the instructions, is configured to: during a first stage: obtain a given link of a plurality of links, the given link referring to an initial malicious web resource; retrieve, from a database communicatively coupled to the processor, simulated user parameters indicative of a simulated user environment and at least one user behavior vector including values indicative of simulated user actions with the initial malicious web resource; based on the simulated user parameters and the simulated user actions, determine at least one redirect chain, a given one of the at least one redirect chain including web resources defining a transition sequence from the initial malicious web resource to a respective target malicious web resource; generate, based on the at least one redirect chain, a redirect graph; and analyze the redirect graph to determine a plurality of user redirect rules, a given user redirect rule including data of a respective transition from the initial malicious web resource towards the respective target malicious web resource associated with a respective simulated user action and at least some of the simulated user parameters; during a second stage following the first stage: obtain, from a user device, a given in-use link referring to a suspicious web resource; obtain in-use parameters of the user device representative of an in-use user environment associated with the user device; determine, for the given in-use link, by the processor, based at least on the in-use parameters, in-use user redirect rules, a given in-use user redirect rule being representative of a respective transition from the suspicious web resource; determine if at least one in-use user redirect rule corresponds to any one of the plurality of user redirect rules to respective target malicious web resources; in response to determining that the at least one in-use user redirect rule corresponds to a given one of the plurality of user redirect rules: identify the respective target malicious web resource associated with the given one of the plurality of user redirect rules; cause restriction of access to the respective target malicious web resource; and transmit a notification to the user device warning about the respective target malicious web resource being malicious.

In the context of the present specification, the terms "network resource" and "web resource", unless specified otherwise, denote any element or a combination of elements of the World Wide Web that can potentially be accessible through the Internet. Even if an element is stored in an encrypted form and on a closed server, it is potentially accessible; therefore, it also comprises a network resource. Within the context of this description, the terms "network resource" and "web resource" further denote any data or data set that can be supplied through the network and are associated with the network resource address. Non-limiting examples of the network resources are HTML pages, documents, images, video recordings, news feeds or the combinations of the above files. The network resources can include content, e.g., words, phrases, images etc. and/or integrated information, e.g., meta data, hyperlinks and/or integrated instructions (e.g., JavaScript scenarios).

Further, in the context of the present specification, the term "redirecting" (also referred to as "HTTP redirecting", "URL redirecting", "URL forwarding") denote a method of representing a page, a form or a whole web application with more than one URL address. The redirecting can typically be implemented by sending a certain HTTP response (a code in the form of 301, 302, 303, 304 or 307) to a web application (e.g., a browser) with which a user interacts, with a new page following the said response, the user having to get an access to the said page, wherein the URL address of this new page is sent into the HTTP response' location header field. In the process, when the browser obtains the redirection response, it redirects the user to the target page automatically. There are also redirections based on the web page HTML meta tags and the redirections based on JavaScript or the Flash technology.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Figure 1:
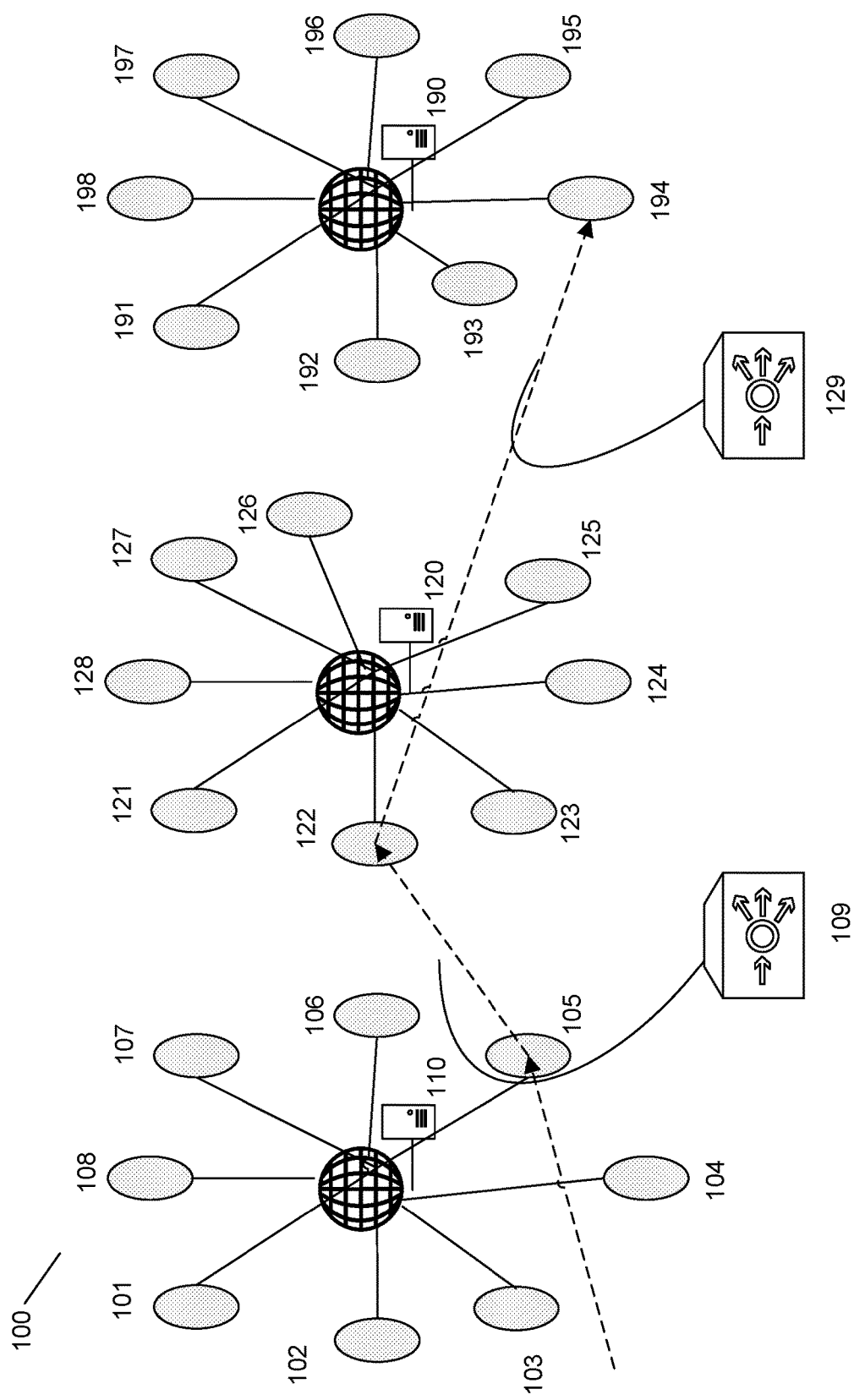
FIG. 1 depicts a schematic diagram of a given redirect chain of web resources defining a transition sequence to a target malicious web resource, in accordance with certain non-limiting embodiments of the present technology.

With reference to FIG. 1, there is schematically depicted a plurality 100 of malicious web resources 100 including web resources 101 . . . -198, in accordance with certain non-limiting embodiments of the present technology.

Within the context of the present specification, "input web resource" or "first web page" are web pages to which a user, browsing various web resources on the Internet, as an example, is first redirected when the malefactors have manage to "trick" him/her into visiting the plurality of the malicious web resources 100. For example, in the example embodiments of FIG. 1, the input web resources (first web pages) are web pages 101, 102, 103, 104, 105, 106, 107 and 108 hosted by a server 110. It should be noted that, for the simplicity and clarity of the present description, the web resources in the drawings have been grouped on three servers 110, 120 and 190 only. In an actual malicious infrastructure, the web resources can be arranged on hundreds or even thousands of different servers which are also located in different countries.

As a result of the first redirection, shown in this example in dashed line, the user can be directed to a first input web resource 105.

According to certain non-limiting embodiments of the present technology, the first user redirection can be implemented, without limitation, through ads, phishing emails, messenger postings and social engineering methods, for example. Further user redirections, such as the redirection from the first input web resource 105 to an intermediary web resource 122, can be controlled, for example, by traffic distribution systems (TDS) that are part of the malicious infrastructure used by the malefactors (e.g., a first TDS 109 or a second TDS 129). Such systems automatically determine a next web resource that the user will be directed to, depending on various parameters of the user browser, operating system settings of the user electronic device, the data input by the user (e.g., answers for questions) and a plurality of other criteria.

Within the context of this description, a "target web resource" is a last web page in the redirect chain depicted in dashed line in FIG. 1 where such web resources are marked at 191, 192, 193, 194, 194, 196, 197, 198 and are hosted by a server 190. Broadly speaking a given target web resource, such as a target web resource 194, is a web resource where the malicious actions are taken, e.g., the deceived user is given an opportunity of purportedly paying for the purchase using a bank card. Also, the target web resource 194 can comprise a direct source of the attackers' income. Thus, blocking users' access to the target web resources may help prevent the malefactor to conduct the malicious attacks.

Further, in the context of the present specification, the term "redirect chain" denotes a sequence of the web resources that the user has been redirected to, from the input resource, such as the first input web resource 105, to the target web resource 194. In other words, this is the whole set of web pages that the user has visited, starting from the first input web resource 105 and finishing at the target web resource 194. The simplified example in FIG. 1 shows the redirect chain consisting of web pages 105, 122, 194. The real structures, similar to the one shown in FIG. 1, can contain much more redirections (the web pages visited by the user); accordingly, in some non-limiting embodiments of the present technology, the length of the redirect chain can be greater.

The present technology is directed to a computer-implementable method and computing device for identifying malicious web resource detection.

Figure 2:
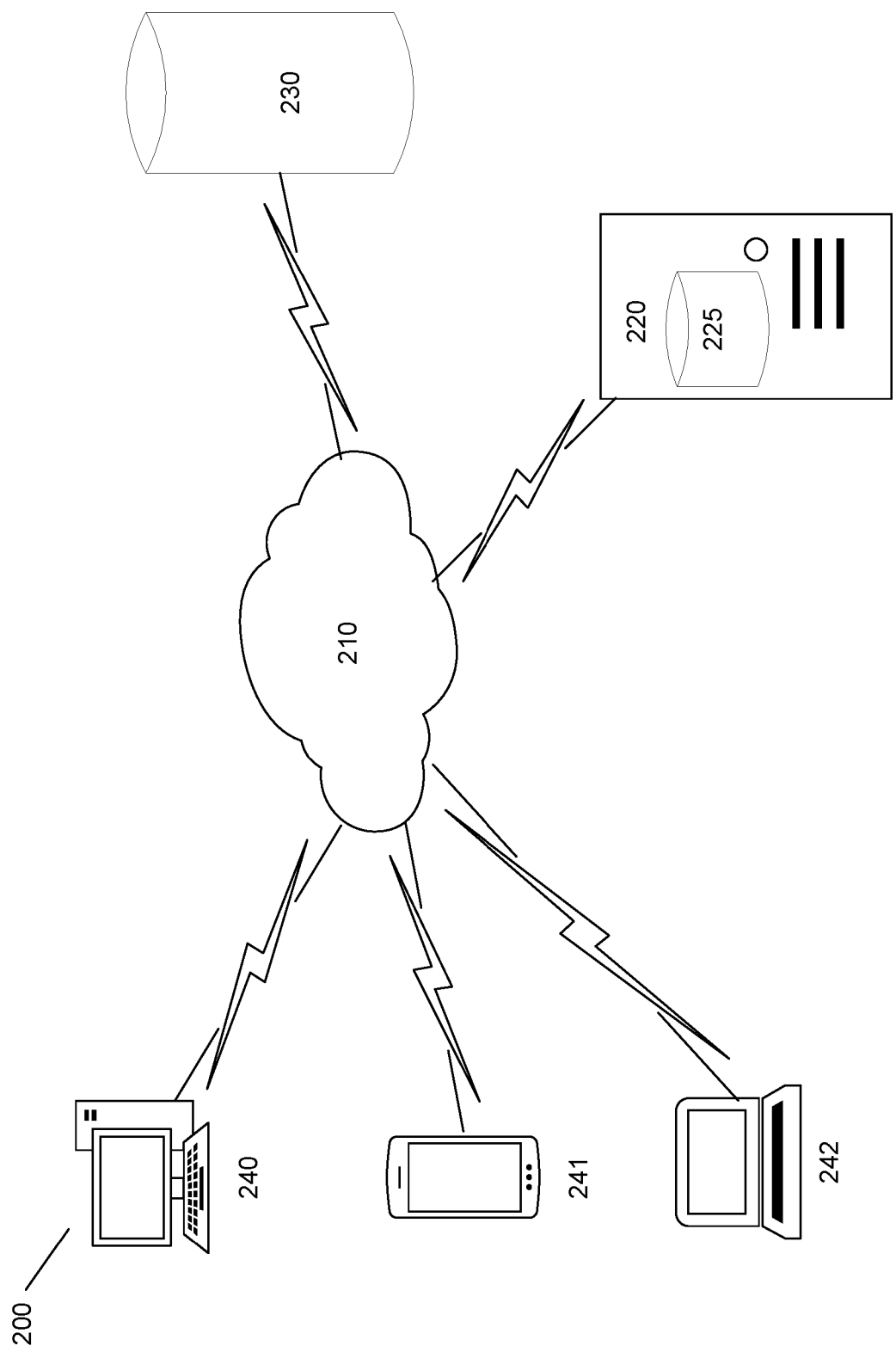
FIG. 2 depicts a system configured for identifying malicious web resources, in accordance with certain non-limiting embodiments of the present technology.

With reference to FIG. 2, there is depicted a schematic diagram of a system 200 configured to identify the malicious web resources, in accordance with certain non-limiting embodiments of the present technology.

According to certain non-limiting embodiments of the present technology, the system 200 comprises: a data transmission network 210; a computing device 220 configured for the target malicious web resource; at least one external data repository 230; and at least one user device, such as a first user device 240, a second user device 241, and a third user device 242.

In some non-limiting embodiments of the present technology, the computing device 220 can be implemented as a conventional computer server and may comprise some or all of the components of a computing environment 500, which will be described below with reference to FIG. 5. In one non-limiting example, the computing device 220 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the computing device 220 is a single server. In alternative non-limiting embodiments of the present technology (not depicted), the functionality of the computing device 220 may be distributed and may be implemented via multiple servers.

Further, in the non-limiting embodiments of the present technology, the at least one user device may be any computer hardware that is capable of running a software appropriate to the relevant task at hand. Thus, some non-limiting examples of the at least one user device may include personal computers (desktops, laptops, netbooks, etc.), smartphones, and tablets. Thus, the at least one user device may also comprise some or all components of the computing environment 500 depicted in FIG. 5.

According to non-limiting embodiments of the present technology, the data transmission network 210 can be the Internet network or any other computer network, for example. Also, a respective communication link between the data transmission network 210 and each one of the computing device 220, the external data repository 230, and the at least one user device depends, inter alia, on how each one of the computing device 220, the external data repository 230, and the at least one user device is implemented. Examples of wireless communication links include, but are not limited to, a 3G communication network link, a 4G communication network link, and the like. The data transmission network 210 may also use a wireless connection any one of the computing device 220, the external data repository 230, and the at least one user device.

According to some non-limiting embodiments of the present technology, the computing device 220 is configured to obtain information on the input web resources. By way of a non-limiting example, such information can include a link to at least one input network resource (the first web page), such as the first input web resource 105 mentioned above. Additionally, the link can include a URL address of the first input web resource 105, Bitly type links (truncated URLs), a domain name and/or the IP address the first input web resource 105.

In other non-limiting embodiments of the present technology, the computing device 220 can comprise a scanning system (or otherwise, a scanner, not depicted) for searching and obtaining references and links to the input web resources. The scanner can be fitted with active networking equipment (not shown in FIG. 2) and use it to communicate over the data transmission network 210 with the at least one user device (240-242). The active networking equipment can include, without limitation, routers, connection switches, gateways (not shown in FIG. 2), as an example.

In yet other non-limiting embodiments of the present technology, the computing device 220 can comprise a special framework (a software platform) allowing, e.g., an operator or a user of the computing device 220 to send the links to the input web resource to the system 220, by filling out a special form, for example.

In some non-limiting embodiments of the present technology, the computing device 220 can be configured to connect to external systems, e.g., to the external data repository 230 and to databases through the data transmission network 210, i.e., through the direct channels and/or one or several networks or other common channels that can include the Internet, intranets and/or other networks and can include wire based and/or wireless communication networks.

As an example, the computing device 220 can be configured to obtain data both from the external data repositories, such as the external data repository 230 (containing, e.g., database ranked information on the known fraudulent web resources), and from an internal data repository 225, hosted by the computing device 220. Also, in some non-limiting embodiments of the present technology, the computing device 220 can be configured to update an internal database of the internal data repository 225 from time to time or periodically, e.g., through scanning the data transmission network 210 or through obtaining information from special web resources forms.

In addition, in some non-limiting embodiments of the present technology, the computing device 220 can be provided with analysis instructions, stored in one of the internal data repository 225 and the external data repository 230. The analysis instructions can be obtained from the Internet users located in different points of the globe, the same Internet users being involved in the process of collecting the information on the malicious web resources.

As an example (but without being limited thereto), the computing device 220 can be configured to mirror traffic from all of the at least user device 240-242 connected to the computing device 220. In the process, the computing device 220 can be additionally configured to analyze the traffic obtained from the at least one user device to detect links to the input web resource in the said traffic.

In some non-limiting embodiments of the present technology, the internal data repository 225 stores the information related to a plurality of network resources. According to certain non-limiting embodiments of the present technology, the internal data repository 225 can additionally or optionally include one or several databases (not shown in FIG. 2). The mentioned separate databases can be part of one and the same physical database or can be realized as separate physical units.

Also, it should be noted that the computing device 220 can be configured to process (analyze) information received from other devices through the data transmission network 210, e.g., in accordance with the HTTP based application' RFC protocol. Various applications can be run on the computing device 220 and transmit data (e.g., files or web pages) in response to requests of the at least one user device (240-242).

It should also be noted that, in some non-limiting embodiments of the present technology, the computing device 220 can also be connected to any other devices, e.g., those including active network equipment (routers, connection switches, gateways) and client devices (mobile devices, smartphones, PCs, MFDs) or databases, through the data transmission network 210.

In some non-limiting embodiments of the present technology, the computing device 220 can be configured to (1) receive, through the data transmission network 210, the links to the input web resources of the malicious infrastructure to model at least one redirect chain through simulating user behavior based on a vector data and user images obtained from the internal or external data repositories 225, 230, (2) to construct the redirect graph based on the accumulated redirect chains data, and also to (3) perform analysis to identify the detected redirect chains for the purpose of creating rules for identifying the target malicious web resources. The computing device 220 can additionally be configured to visualize the created redirect graph for presentation thereof to operators or users.

In some non-limiting embodiments of the present technology, as mentioned above, to pre-analyze the redirect chain and to block the target web recourse 194 for the user, the computing device 220 is configured to receive instructions from at least one user device (e.g., 240).

Also, as it can be appreciated, the system 200 can include various users of the web sites and/or applications/services that connect to the data transmission network 210 through their respective user devices (such as devices 240-242) which can be stationary devices (e.g., a desktop computer, a workstation or an IoT device) or mobile devices (e.g., a smartphone, a tablet computer, a laptop), to interact with client web applications, such as a browser or an application developed to access a system/service.

Thus, according to certain non-limiting embodiments of the present technology, the computing device 220 can be configured to establish the connection with the at least one user device 240-242 through the data transmission network 210. To do so, the computing device 220 can transmit a specially configured module to the at least one user device 240-242, the same module being realized in any known programming language and serving for the establishment of a protected channel in the data transmission network 210 between the at least one user device and the computing device 220 for causing the at least one user device to re-translate (mirror), to the computing device 220, the links to all the web resources with which the user interacts through the at least one user device 240-242. It should be noted that the frequency of the data acquisition from the at least one user device 240-242, the data category, the exceptions etc. are not limited, and in some non-limiting embodiments of the present technology, can be set by the user itself, as an example. Additionally, the computing device 220 can be configured to receive, from the at least one user device, data on the user system environment, to emulate the redirect chain. In doing so, the data that are part of the user's system environment do not contain personal data. As an example, such data can include information on a region of the user, a browser version, a type and version of the at least one user device, an operating system run at the at least one user device, and the like.

The at least one user devices 240-242 are configured to connect to the computing device 220 through the data transmission network 210, to provide the computing device 220 with the data for the analysis.

In some non-limiting embodiments of the present technology, the at least one user devices 240-242 can be additionally configured to establish a connection with the computing device 220 through the data transmission network 210, to provide the computing device 220 with the constructed redirect chains.

Given the architecture and the examples provided hereinabove, it is possible to execute a method for identifying malicious web resources, such as the target web resource 194 mentioned above with reference to FIG. 1. According to certain non-limiting embodiments of the present technology, the present method comprises two stages: (i) a first stage 300 (also referred to herein as "preparatory stage"), during which user redirect rules are determined, and (ii) a second stage 360 (also referred to herein as "working stage"), during which the determined user redirect rules are applied to determine the malicious web resources, such as the target web resource 194. For example, the method can be executed by a processor 501 of the computing device 220 described above.

With reference now to FIG. 3, there is depicted a flowchart of the first stage 300 of the present method of identifying the malicious web resources, in accordance with certain non-limiting embodiments of the present technology. Step 310 Obtaining, by the Processor, a Given Link of a Plurality of Links, the Given Link Referring to an Initial Malicious Web Resource The first stage 300 of the present method commences at step 310 with the processor 501 of the computing device 220 being configured for obtaining a link to at least one known malicious input web resource, such as the first web resource 105 mentioned above.

According to certain non-limiting embodiments of the present technology, the link to the first web resource 105 can include, without limitation, at least one of: a domain name of the first web resource 105, IP addresses associated with the first web resource 105, URLs associated with the first web resource 105, as an example.

As mentioned above, the processor 501 can be configured to obtain the link to the first input web resource 105 from either one of the external and internal data repositories 225, 230. As an example, the latter can include the databases of the websites related to the malefactors; also, any other external data repository can be used that is configured to store at least one link to a web resource.

In other non-limiting embodiments of the present technology, the processor 501 can be configured to obtain the link to the first input web resource 105 directly from the user of the at least one user device, e.g., through a special form created in a user framework described previously, or through entering data into the internal data repository 225.

In other non-limiting embodiments of the present technology, the processor 501 can be configured to obtain the link to the first input web resource 105 through collecting hyperlinks to the known malicious web resources from the messenger messages, social networks, user device mailboxes and during traffic mirroring. In such a case the computing device 220 can be configured to extract the hyperlinks or other references from the received messages.

Also, in additional non-limiting embodiments of the present technology, the processor 501 can be configured to obtain the link to the first input web resource 105 through scanning network web resources communicatively coupled to the data transmission network 210. To that end, in some non-limiting embodiments of the present technology, the processor 501 can be configured execute a web robot or a crawler, which is also configured for performing scanning of the network web resources. The computing device 220 can additionally comprise a task scheduler storing the crawler startup timetable and the list of other conditions for network scanning.

In other non-limiting embodiments of the present technology, the processor 501 can be provided access to and execute any software capable of network surveillance and identification of the web resources conforming with the set parameters for scanning the data transmission network 210 to search for the network resources.

After the computing device 220 obtains the link to the first input web resource 105, the first stage 300 proceeds to the step 320.

Step 320: Retrieving, by the Processor, from a Database Communicatively Coupled to the Processor, Simulated User Parameters Indicative of a Simulated User Environment and at Least One User Behavior Vector Including Values Indicative of Simulated User Actions with the Initial Malicious Web Resource At step 320, the processor 501 can be configured to retrieve user behavior vectors indicative of simulated user actions with the first input web resource 105 and user parameters indicative of simulated user environment.

It should be noted that within the context of this description the term "user environment" denotes a so-called system environment, i.e., the set of parameters characterizing the settings of an actual or simulated user device, of an operating system installed thereon, of applications run on such a user device, including, for example, a user browser thereof, etc. Such settings can include, without limitation, an IP address, an operating system interface language, and the like.

It should be noted that certain non-limiting embodiments of the present technology are based on a premise that the first input web resource 105 is typically created by the malefactors expressly to collect various user environment information from the at least one user device (such as one of the first, second, and third user device 240, 241, 242) of the user. In various non-limiting embodiments of the present technology, such information can include, without limitation, at least one of: information on the IP address, user device type, versions of the programs installed on the user device, region, device interface language, operating system language, interface language of the application used to visit the web resource, provider names and cookies stored at the user device. These data are used by the malefactor's system to build a picture of the user environment of the user of the at least one user device. The detected information comes to the malefactors TDSs (such as one of the first and second TDSs 109, 129 described above) for the selection of the next redirect stage.

In some non-limiting embodiments of the present technology, the first input web resource 105 may have no content, or can only include a link to a next web page in the at least one redirect chain. However, in other non-limiting embodiments of the present technology, the first input web resource 105 can contain some content which can be. e.g., a graphic banner ad, an invitation text or a user questionnaire form.

Each of the intermediary web resources of the malefactor's network infrastructure can also gather some information about the user both «by hand», e.g., by tricking the user into filling in questionnaire or the survey forms, and automatically, based on the analysis of the user device, its geolocation data, visit time etc. Based on the obtained information, at the next stage the TDS, such as the first TDS 109, usually redirects the user to an other web resource, such as the intermediary web resource 122 mentioned above, containing text in the language that the user is familiar with, as well as the familiar brand name and other peculiarities providing for higher conversion (i.e., in this case, the user's decision to «enter the promotion», to «pick up a prize for participating in the poll» etc.) In this way, the malefactors try to avoid blocking the intermediary network resources (indeed, technically, such intermediary resources may not break any laws), but, at the same time, to redirect the user to a functional active target web resource, such as the target web resource 194, that will let them to conduct the malicious attack against the user which, for example, may cause financial damage to the user. In other words, the target web resource 194 is usually configured in such a way that it is impossible to reach directly, bypassing the whole the redirect chain.

Thus, certain non-limiting embodiments of the present technology are based on a premise that to construct the at least one redirect chain, it is necessary to imitate a real user behavior of the user, for example, of the at least one user device 240-242, using, for example, the user behavior vectors indicative of the simulated user behavior. For the TDS 109 used by the malefactors to be «sure» that it redirects a real user, the data collected by the TDS 109 at every redirect step should be identical to the data that would come thereto if a real Internet user would have visited the first input web resource 105.

Therefore, during the at the first stage 300, the processor 501 of the computing device 220 is configured to retrieve a plurality of user behavior vectors and user parameters for further use in determining a target web resource of a given malefactors traffic distribution, such as the target web resource 194. This would allow constructing the at least one redirect chain from the detected input web resources, identifying the regularities based on which the redirection takes place and using these regularities afterwards to detect fraudulent target web resources and to block them.

According to certain non-limiting embodiments of the present technology, for generating the user behavior vectors, the processor 501 can be configured to register changes in the operating system in response to sequences of user actions in a controllable runtime environment, such as, e.g., virtual machines with a specially installed OS, a sandbox, an emulator or any other applications. In one example, the processor 501 can be configured to use virtual browsers in a controllable environment, which are web browsers with a respective extension being installed using the virtual browser setting and the browser cache is cleaned, after which the first input web resource 105 is visited. At the same time, logging is carried out using the browser features, i.e., the browser automatically saves to the hard drive all the information on (i) the performed transitions from one web resource to another, (ii) on the additional parameters inserted into the URL address and corresponding to those transitions, (iii) on the user behavior vectors and user profiles used during the said operations. In some non-limiting embodiments of the present technology, the virtual browser can be configured to take screen shots of web pages of every visited web resource. In addition to the virtual browser, any other suitable software can be used as a logging instrument, e.g., a script written in any programming language and capable of being interpreted within the controllable environment to obtain the sequence of transitions between the web resources.

It should be noted that the user behavior in fraudulent web resources is simulated using pre-generated user behavior vectors and user parameters (profiles) that can be stored in any one of the internal data repository 225 of the system 200, and in the external data repository 230 available through the data transition network 210.

In the non-limiting embodiments of the present technology, the user behavior vectors comprise scripts written in advance. They can be written in any programming language allowing to write the instructions for applications (such as a browser, for example, a Goggle Chrome™ browser) in the form of a script. In some non-limiting embodiments of the present technology, such instructions include a set of commands for performing a sequence of actions, such as following a link, data entry, selecting one of the proposed options in the list of options etc. The user behavior vectors can be stored both in the internal data repository 225 of the device 220, and in a specialized user behavior vectors database. Each file containing one specific script or each database record containing a specific script (user behavior vector) can be provided with a unique identifier allowing, firstly, to distinguish this script from other scripts, and secondly, to quickly find it in any databases where it is mentioned. The identifier include, without limitation, e.g., a decimal number or a result of a hash function taken from the given script text.

The user parameters can be stored, e.g., in a text file format or in a database record format, either in the internal data repository 225 of the device 220, or in a specialized user parameter (profile) database. Each such file or database record containing a specific user profile (parameters) can be provided with a unique identifier allowing, firstly, to distinguish this script from other scripts, and secondly, to quickly find it in any databases where it is mentioned. The identifier can include, without limitation, e.g., a decimal number or a result of a hash function taken from the content of this file or record.

According to certain non-limiting embodiments of the present technology, each such file or user parameters record contains a set of common parameters used by the modern Internet applications and available to any web resources for reading. Using the same parameters, the processor 501 can be configured to obtain information on the user and his/her environment from any legitimate web sites: the search systems, the online shops etc. For example, these parameters can include, without limitation, at least one of: the user IP address, user device geolocation data, redirection time, information on the user device, on the operating system, name of the used provider, version of the user browser, cookie files, time (system and actual values), URL referrer etc.

Thus, prior to visiting the first input web resource 105, the processor 501 of the computing device 220 can be configured to read a given set of user parameters from the file and places these parameters into the controllable runtime environment as the variable values for this environment. From the «point of view» of any traffic management system, these parameters will be identical to the environment settings of a certain user who has accessed the first input web resource 105 from an actual user device. After that, the computing device 220, in accordance with the used script describing a given pre-generated user behavior vector, goes to the first input web resource 105. Thus, the malefactors traffic distribution system is given the opportunity to read the given set of user parameters.

It should be noted that the fraudsters typically target a specific category of users. For example, such a category can include people living in a certain region or users with a certain known version of the browser installed that has a vulnerability etc. That is why some of the transitions to the input web resource (that is those transitions that the processor 501 has imitated based on the parameters or simulated actions of a «wrong», from the malefactors' perspective, user) will not result in constructing of the at least one redirect chain.

A wide variety of the pre-generated user behavior vectors and sets of user parameters can be stored in either one of the internal data repository 225 or in the external data repository 230. From a technical point of view, the storing of such data sets can be implemented, e.g., in a form of a table, a given row of which (e.g., the «user country» row) can be used for storing a set of various values which can be indicative of a respective entry of the given row (e.g., «Spain, France, Russia»).

The first stage 300 of the present method hence advances to step 330.

Step 330: Based on the Simulated User Parameters and the Simulated User Actions, Determining, by the Processor, at Least One Redirect Chain, a Given One of the at Least One Redirect Chain Including Web Resources Defining a Transition Sequence from the Initial Malicious Web Resource to a Respective Target Malicious Web Resource At step 330, based on the user behavior vectors and the user parameters obtained at step 320, the processor 501 can be configured to determine the at least one redirect chain defining a transition sequence from the first input web resource 105 to the target web resource 194.

To that end, the processor 501 can be configured to use, for each of the input web resources, such as the first input web resource 105, at least two different user behavior vectors and at least two different sets of user parameters. In other words, the processor 501 can be configured to visit the first input web resource 105 at least two times, using two different combinations of the simulated user actions, represented by a respective user behavior vector, and a respective set of user parameters. This further allows determining the redirect chains regularities.

All the successful (i.e., those that allowed constructing the at least one redirect chain) user behavior vectors and sets of user parameters are additionally saved in the system 200 (for example, in one of the external and internal data repositories 230, 225) together with the links, screen shots and content copies of the web pages that were available during the advancement along the at least one redirect chain.

Further, the processor 501 can be configured to conduct an item-by-item examination of various user behavior vectors and user parameters until the target web resource 194 is detected.

To verify the fact that a given detected resource is the intermediary web resource 122 and not the target web resource 194, the processor 501 can be configured to perform additional checks of every web resource for the presence of malicious actions are performed using, e.g., one or more methods described below with regard to step 380. In one non-limiting example, a given check can comprise determining if a given intermediary web resource includes a graphical user interface (GUI) element for entering banking card details. In another non-limiting example, the given check of the given intermediary web resource can comprise determining if the given intermediary web resource requests to upload the scanned image of a passport or a driver's license.

In another example, the processor 501 can be configured to determine an end of the redirect chain, i.e., to detect the target web resource 194 based on an analysis of the HTTP response codes received by the browser. For example, when after at least three redirections the processor 501 of the system 200 stops receiving HTTP responses containing codes of the 301, 302, 303, 304 or 307 type, the processor 501 can be configured to determine that no redirections are to be made from the current web page and, therefore, the current web page comprises the target web resource 194.

At the intermediary web resources, such as the intermediary web resource 122, the processor 501 can be configured to check the HTML code of the intermediary web resource 122 to determine presence of certain GUI elements, such as questionnaire forms and/or fields that the malefactors suggest the visitors fill out to go to a next web resource of the at least one redirect chain of web resources. If the processor 501 has determined the presence of such GUI elements, the processor 501 can further be configured to fill them out with the data chosen based on each GUI element's format (e.g., the «Telephone» field is filled with seven-digit numerical set, the «Address» field—with a certain address taken from the database related to the same country as the used user profile, etc.) The data for filling the fields can be both generated based on the preset templates and retrieved from a prearranged database that can be located both in the internal and external data repositories 225, 230. The processor 501 can be configured to determine the types of the GUI elements based on the key words (headers of the GUI elements) or, if this is not possible, through the item-by-item examination of various formats. The main types of formats can be at least the following ones, without limitation: the address, the telephone number, the email address, the person's full name and the user-defined text field. It should be noted that for every format, both during the filling and during the template-based generation, variants can be provided taking into account the regional specifics; e.g., the «ZIP code» can be filled with a six-digit number for the Russian Federation and with a five-digit number for the USA etc.

In an example, if the processor 501 has determined the format of a given GUI element for a previously unknown header of the given GUI element, the processor 501 can be configured to save the format for this GUI element in the database which can be located in any one of the internal and external data repositories 225, 230. In the process, the processor 501 of the system 200 saves both the identifiers and the value or type of the given GUI element (if it can be included with some type). The identifiers of the given GUI element can comprise, without limitation, one of: a length, a name of the given GUI element visible on page, an id of the given GUI element in the HTML code of the page, a class of the given GUI element in the HTML code of the page etc. If the processor 501 encounters an unknown GUI element with one of the previously determined identifiers, the processor 501 can be configured to search the database for a respective record thereof associated with the one of the previously determined identifiers, and if the search proves successful, the value format or the value itself will be used that has previously resulted in successful matching.

Thus, to successfully match the necessary format in the existing GUI elements, the processor 501 of the computing device 220 inserts the values of the main types and their combinations by examining them item-by-item until the preset condition is satisfied. In so doing, the successful matching, in accordance with the given condition, is the one that allows avoiding the occurrence of errors and leaving the web page with a questionnaire or a survey form, for example, while advancing further along the at least one redirect chain.

The data used for filling out the GUI elements can be optionally saved together with the information on the web page where they have been used, for further analysis.

Figure 4A:
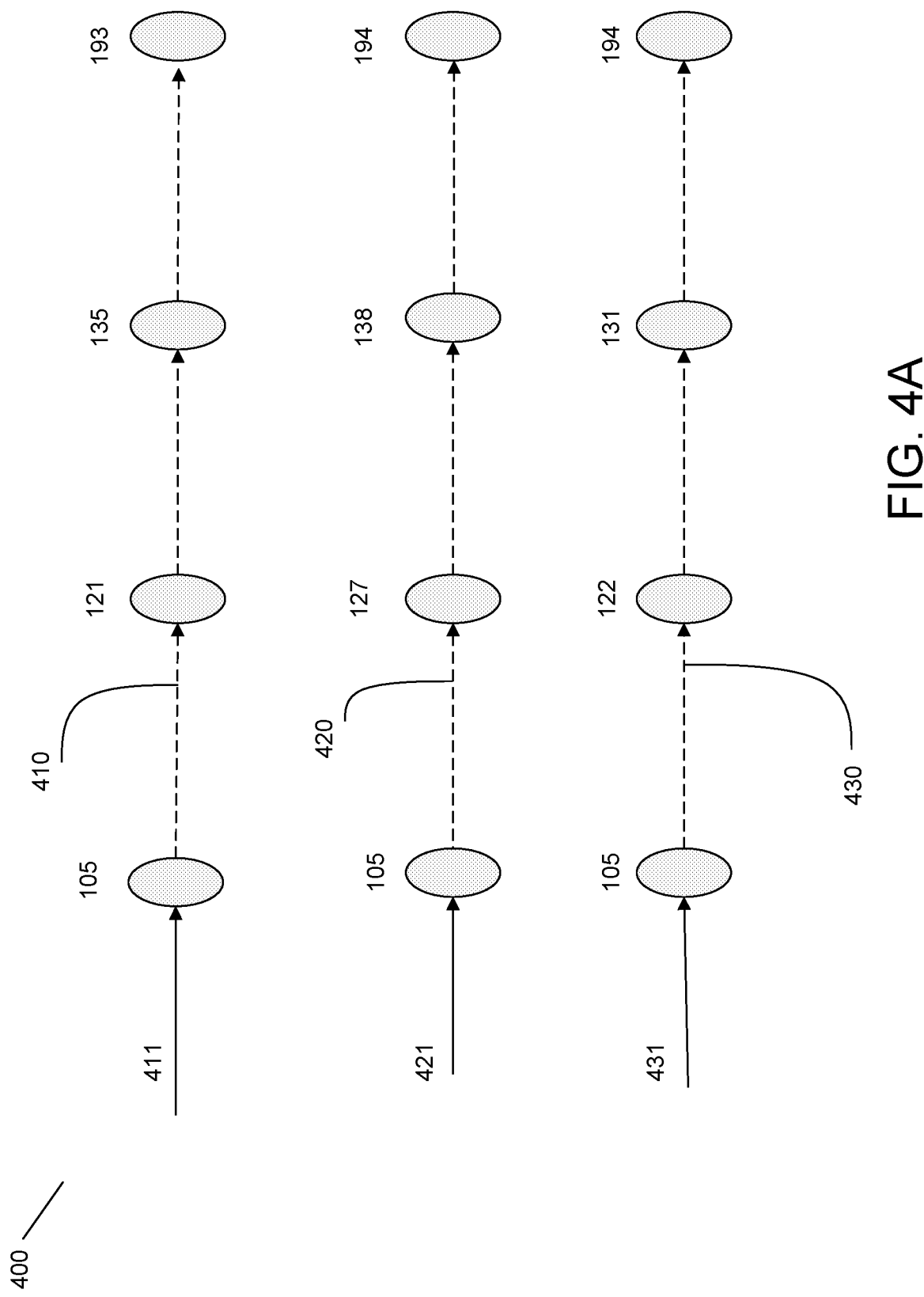
FIG. 4A schematically depicts three redirect chains defining transitions to a respective target malicious web resource, in accordance with certain non-limiting embodiments of the present technology.

Further, with reference to FIG. 4A, there is depicted a schematic diagram of determining, by the processor 501 redirect chains 400 from the first input web resource 105 to the target web resource 194, in accordance with certain non-limiting embodiments of the present technology. It should be noted that all the data, including the numbers of the redirect chains 400, nodes and arcs, are given solely for the purpose of illustration; any other data obtained during the implementation of first stage 300 can be used here, including the fact that the redirect chains can contain other numbers of web resources and transitions therebetween.

In the example depicted in FIG. 4A, the redirect chains 400 include a first redirect chain 410, a second redirect chain 420, and a third redirect chain 430. All of them have been constructed, by the processor 501, based on the link to the first input web resource 105 obtained at step 310. Each one the redirect chains 410, 420, 430 consist of various web resources; this is due to the fact that, when going to the first input web resource 105, the processor 501, as has been described in regard to step 320, used three different pre-generated user behavior vectors and three different pre-formed sets of user parameters (hereinafter, these data, for the sake of simplicity and clarity, are collectively called «vectors»). As can be seen from FIG. 4A, when going to the first input web resource 105 with a first user vector 411, a redirection to a second intermediary web resource 121 has occurred; when going to the first input web resource 105 with a second user vector 421, a redirection to a third intermediary web resource 127 has occurred; and when going to the first input web resource 105 with a third user vector 431, a redirection to the intermediary web resource 122 has occurred.

Therefore, using a successful imitation of the user by the first user vector 411, the processor 501 can be configured to determine the first redirect chain 410 consisting of the web resources 105, 121, 135, 193, wherein numeral 193 labels a second target web resource 193. Similarly, by using the second user vector 421, the processor 501 can be configured to determine the second redirect chain 420 consisting of the web resources 105, 127, 138, 194. Finally, by using the third user vector 431, the processor 501 can be configured to determine the third redirect chain 430 consisting of the web resources 105, 122, 131, 194.

It should be noted that in the process of transitioning along the redirect chain, information is additionally collected on every web resource that is part of each one of the redirect chain 400. For example, the processor 501 can be configured to collect and further store at least the following information:

a URL link to a given detected web resource,
    an ID and other parameters within the body of the URL (link) referencing the given detected web resource;
    a time and date of detecting the given detected web resource;
    geolocation data associated with the given detected web resource;
    information on a provider associated with the given detected web resource;

an ID/company or brand name used on the given detected web resource.

At least some of the above data the processor 501 can be configured to obtain, e.g., by using open web services, such as, e.g., WHOIS allowing obtaining the register's name, localization, language, registration date, website administrator contact information, methods of contacting the administrator, addresses of the DNS servers, and the others.

Further, the processor 501 can be configured to obtain the information on the companies or brands used on this web resource, e.g., by parsing the text available on at least one web page of the given detected web resource and by further checking every word found on the at least one web page against a pre-generated list of brands and companies stored, for example, in the internal data repository 225.

After constructing the at least one redirect chain, such as one of the redirect chains 400, the processor 501 can be configured to store the chain itself and all the listed information on each of web resources thereof, as well as the data on the sequence of transitions between these web resources, for example, in the internal data repository 225.

Figure 3A:
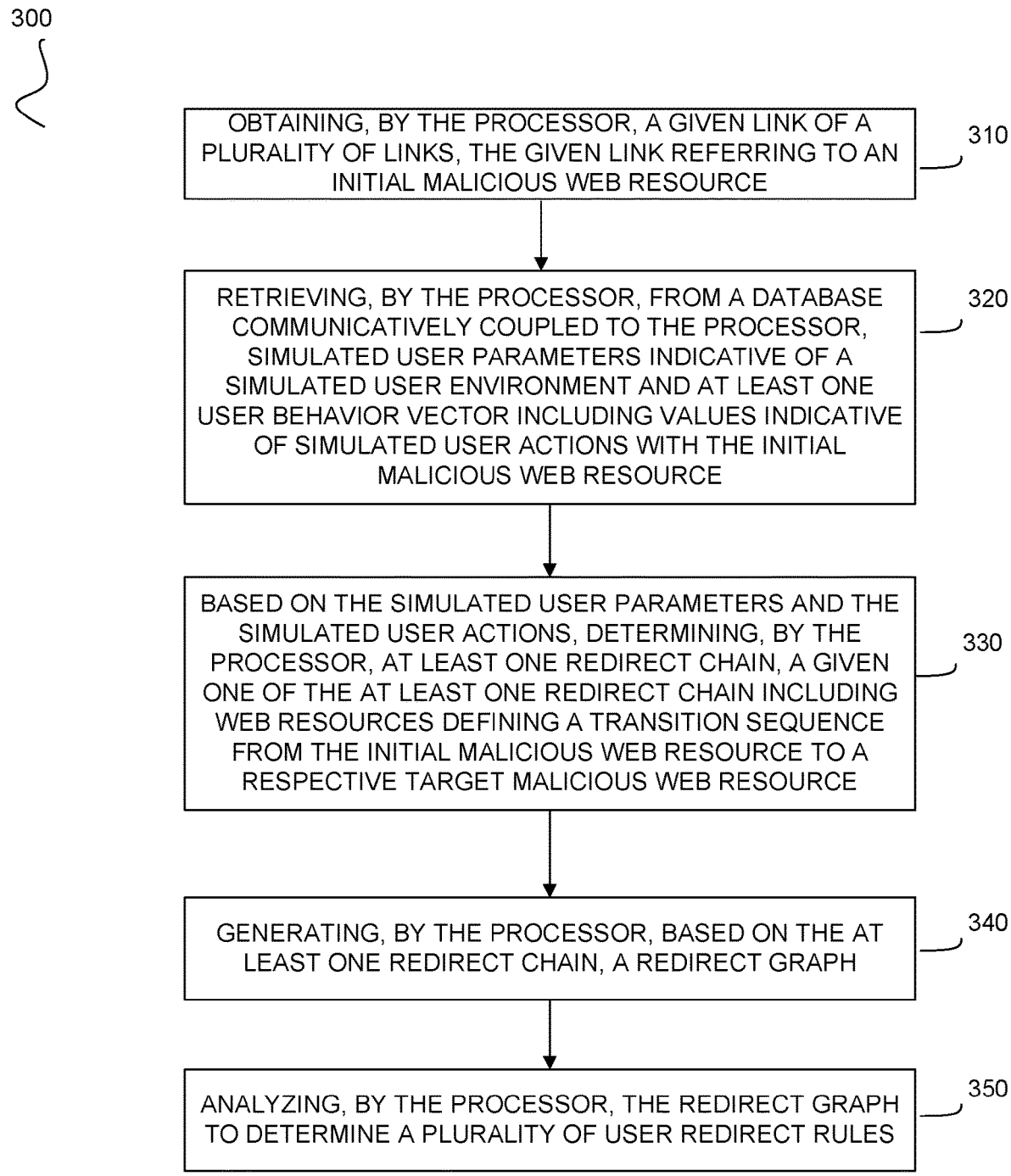
FIGS. 3A and 3B depict flow diagrams of different stages of the method of identifying, by a computing devices present in the system of FIG. 2, the malicious web resources, in accordance with certain non-limiting embodiments of the present technology.

With back reference to FIG. 3A, the first stage 300 hence advances to step 340.

Step 340: Generating, by the Processor, Based on the at Least One Redirect Chain, a Redirect Graph At step 340, according to certain non-limiting embodiments of the present technology, the processor 501 can be configured to combine the redirect chains 400, determined as described above, into at least one redirect graph, such as a redirect graph 440 schematically depicted in FIG. 4C, in accordance with certain non-limiting embodiments of the present technology.

Within the context of this specification, a given "redirect graph" is a graph combining all the detected redirect chains starting from at least one input web resource, such as the first input web resource 105, the link to which has been obtained at step 310. A given vertex (or otherwise, a "node") of the given redirect graph represents a respective detected web resource, and a given edge connecting a pair of vertices represents a respective transition between the respective web resources represented by the pair of vertices.

However, it should be noted that although in a simplest case the given vertex is representative of a single web resource with one URL address, in other non-limiting embodiments of the present technology, the given vertex of the given redirect graph can be representative of a plurality of grouped (affiliated) web pages having different URL addresses. These pages can be grouped and represented as one vertex due to the fact that all of them may have common characteristics (e.g., all of them contain references to the same brand or the same makeup dummy is used on all of these pages etc.)

In various non-limiting embodiments of the present technology, to determine the web resources that have common features and are related to one another, for example, the processor 501 can be configured to analyze screen shots of the web resources saved in the internal data repository internal data repository 225—to detect the web resources templates affiliation; or, the computer vision methods—to detect visually similar resource groups. In addition, the methods based on the web resource HTML code analysis can also be used.

That said, in some non-limiting embodiments of the present technology, prior to constructing the redirect graph 440, the processor 501 can be configured to identify affiliations with the detected web resources.

Figure 4B:
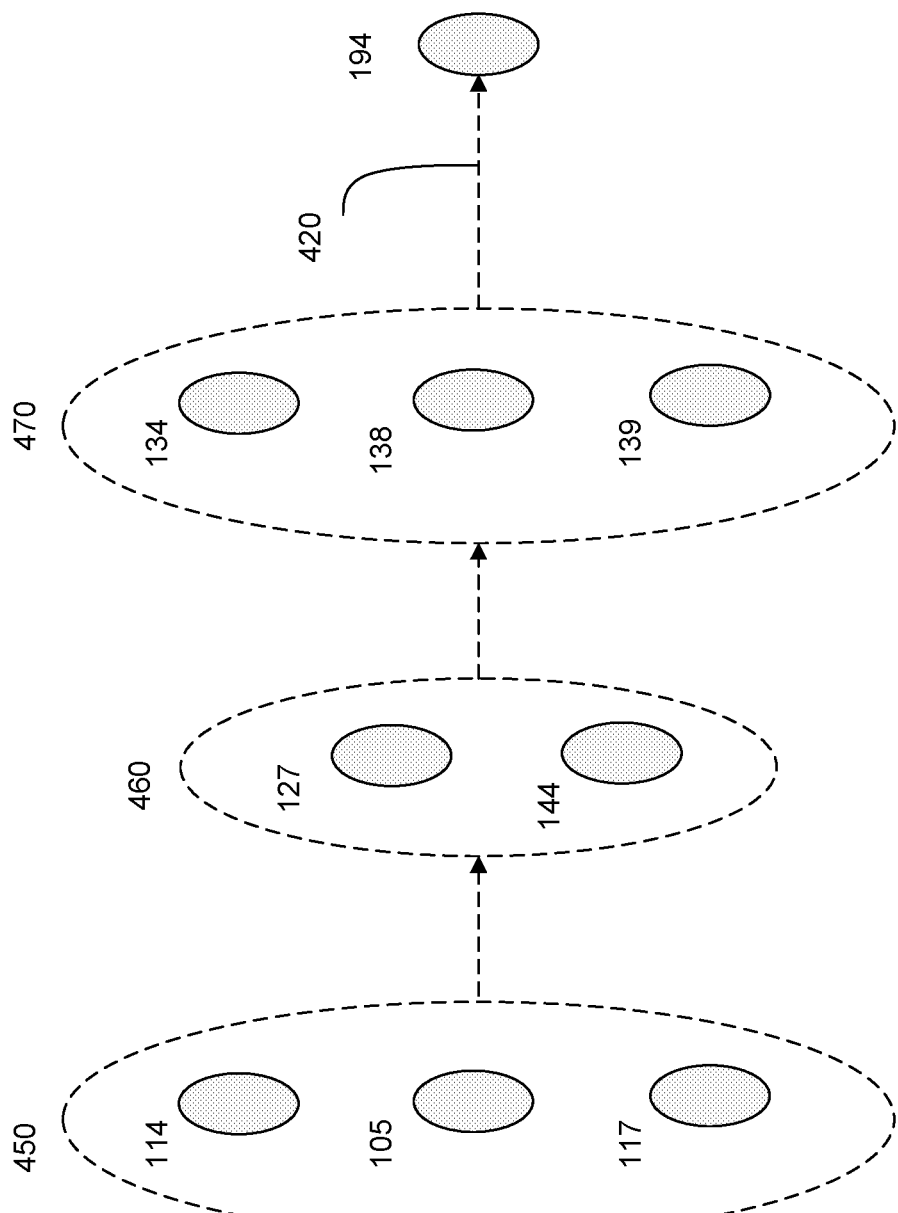
FIG. 4B schematically depicts a redirect chain containing similar web resources, in accordance with certain non-limiting embodiments of the present technology.

With reference to FIG. 4B, there is depicted a schematic diagram of identifying, by the processor 501, affiliated web resources within the second redirect chain 420, in accordance with certain non-limiting embodiments of the present technology.

For example, by analyzing the data stored in the internal data repository 225, the processor 501 can be configured to determine that the web resources 114 and 117 contained in the internal data repository 225 are visually similar to the first input web resource 105, but differ, for example, in brand logos used in the page design. Further, the processor 501 can be configured to determine that the web resource 144 contains text completely analogous to the text of the web resource 127. In yet other example, the processor 501 can be configured to determine that the web resources 134 and 139 are located at the same IP address that the web resource 138.

As an example (but not being limited to that example), let us note that in case of the fraudulent pages, one and the same brand name can always be used, but, that said, the malicious pages' domain names may be different for different URL addresses; however, other parts of these URL addresses can remain the same.

For example, in the URL address http://www. [some.domain]/adidas/great-sale-90-discount/register.html?parameter1¶meter2 various domain names (e.g., freeserver.com, HyperHost.ua, Ucoz.ru etc.) can be used instead of [some.domain]. In other words, the rest of the link can look identical for all the pages used by the malefactors.

In the non-limiting embodiments of the present technology, the web resources that are part of a same redirect chain can be represented by a plurality of lookalike grouped web resources. Additionally, the processor 501 can be configured to identify the web resources as being similar if, for example, at least one of the following elements match:

all parts of the URL address (i.e., the domain, the page name and the parameter names, all parts of the address, except for the top-level domain, top-level domain names;

lengths of the domain name, of the top-level domain name, of the page names and of the parameter names; and IP addresses.

Thus, as depicted in FIG. 4B, the web resources 114, 105, 117 can be grouped into a first vertex 450, the web resources 127 and 144—into a second vertex 460, and the web resources 134, 138 and 139—into a third vertex 470 of the redirect graph 440.

Hereinafter, the process of the redirect graph 440 construction from a plurality of redirect chains will be described in detail. According to certain non-limiting embodiments of the present technology, to construct the redirect graph 440, the processor 501 can be configured to access all the redirect chains, such as the redirect chains 400 saved in the internal data repository 225, and, for every redirect chain at least, retrieve at least the following data: information on the respective input web resource, on the target web resource, on the groups of the detected affiliated web resources, the links to each of the web resource of the given redirect chain, and the information on the user behavior vectors and user parameters used to determine the given redirect chain.

Figure 4C:
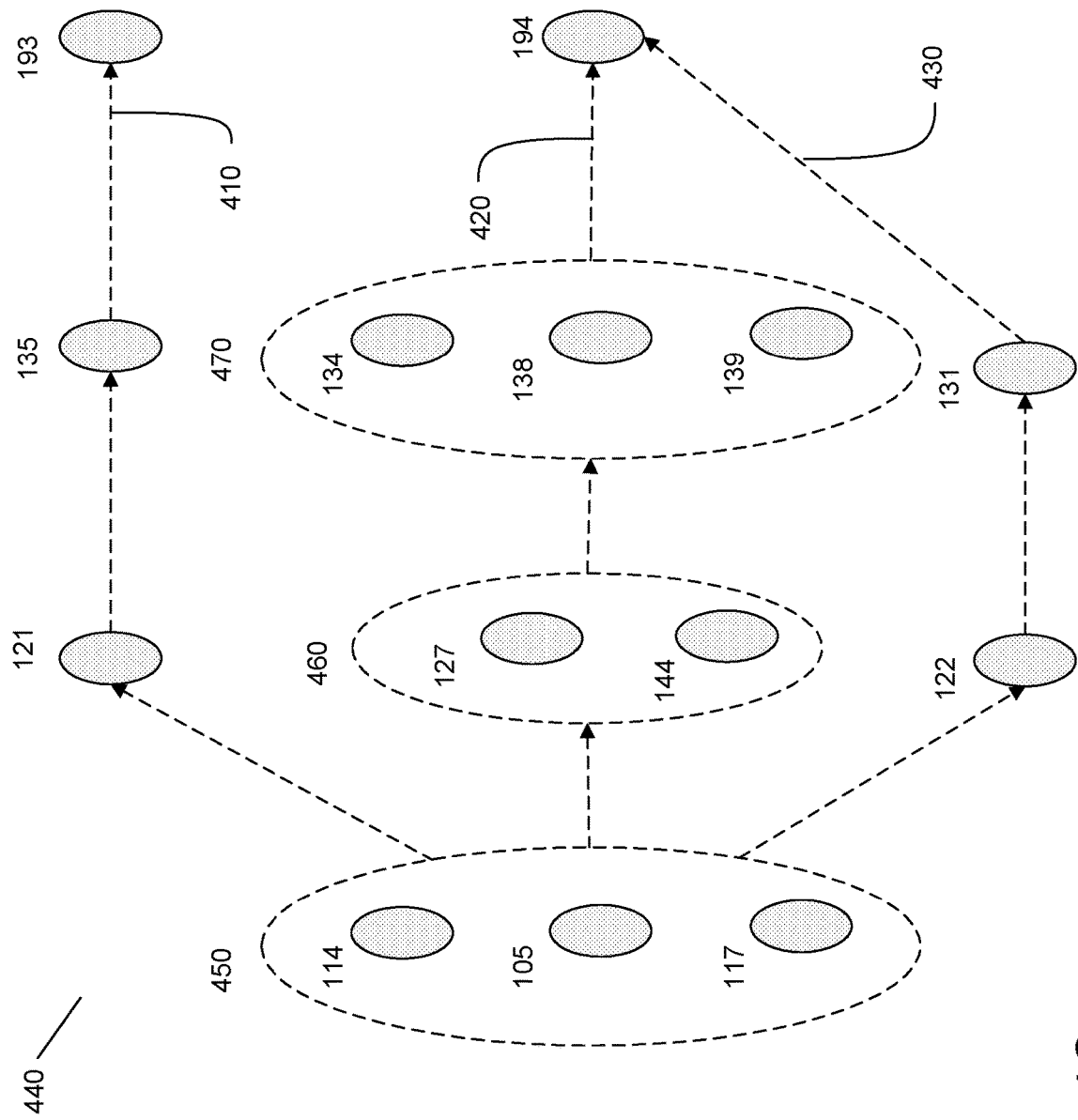
FIG. 4C schematically depicts a plurality of redirect chains combined into a redirect graph, in accordance with certain non-limiting embodiments of the present technology.

First, with reference to FIG. 4C, according to certain non-limiting embodiments of the present technology, the processor 501 can be configured to compare each vertex (associated with the respective web resource) of a given one of the redirect chains 400 with the vertices (web resources) of other ones of the redirect chains 400 in a multithreading mode. If exactly matching vertices (as, e.g., the first vertex 450 which is present in all three chains 410, 420 and 430) are identified, these matching vertices are considered to be one graph vertex. Therefore, the first vertex 450 becomes the input graph vertex common to all the three chains 410, 420 and 430.

If the processor 501 could not find an affiliated vertex with a given vertex (that is, some parameters of the respective associated web resource are different from those associated with other vertices), the processor 501 can be configured to add this vertex to the redirect graph 440 as a new vertex; plus, if no edges yet existed in the redirect graph 440 connecting this new vertex with a previous one, the processor 501 can be configured to add such an edge, as well. Thus, since the first vertex 450 in the first redirect chain 410 is connected to the vertex 121, the first vertex 450 in the second redirect chain 420 is connected to the second vertex 460 (not coinciding with the vertex 121) and the first vertex 450 in the third redirect chain 430 is connected to the vertex 122 (not coinciding with the vertices 121 and 460), three new vertices 121, 460 and 122 will be added to the redirect graph 440, all of those vertices being connected to the vertex 450.

Further combining the chains 410, 420 and 430 based on the above rules, the processor 501 can be configured to construct the redirect graph 440, as shown in FIG. 4C. As it can be appreciated, there is only one vertex 194 corresponding to the target web resource and present both in the second redirect chain 420 and in the third redirect chain 430; that said, other vertices, such as that corresponding to the second target 193 can be present in the redirect graph 440.

The existence of such unified redirect graph, essentially, may mean that the user having visited the first input web resource 105 or the similar resources 114, 117 can be redirected to one of the web resources 121, 122, 127, 144 from where he/she may be redirected to one of the web resources 135, 134, 138, 139, 131 from which, in turn, the user will get at one of the two target web resources 193 or 194. It should be noted that FIG. 4C depicts a simplified example of the redirect graph 440. In some non-limiting embodiments of the present technology, the redirect graph 440 constructed as described above during automated examination of the malefactors web resources structure, can include hundreds, thousands, or even tens or hundreds of thousands vertices.

All the data obtained at step 340, including the user vectors 411, 421, 431 used for the detection of each of the redirect chains 440 can further be saved, by the processor 501, in the internal data repository 225.

The first stage 300 of the present method hence advances to step 350.

Step 350: Analyzing, by the Processor, the Redirect Graph to Determine a Plurality of User Redirect Rules At the last step of the first stage 300, according to certain non-limiting embodiments of the present technology, the processor 501 can be configured to analyze the redirect graph 440 to determine the rules used by the malefactors traffic management systems in redirecting the users from the input web resources to the target malicious web resources.

When analyzing the user behavior vectors and the user parameters, the processor 501 can be configured to identify the values, parameters or actions that resulted in the redirection of the users to a specific web resource. The redirecting rules identified at this step, essentially, are the traffic management system settings used by the malefactors in the network infrastructure, that have been reconstructed analytically. As has been mentioned before, the malefactors normally target a specific group of users, and the found regularities can, in fact, be practical in describing the user group that the malefactors target with their infrastructure under examination.

More specifically, the processor 501 can be configured to determine the similarities and differences in the user behavior vectors and user parameters that have been used while identifying every redirect chain at step 330. By analyzing the user parameters, i.e., their geographical location, the versions of the devices, operating systems and browsers, the OS and the application language settings, the processor 501 can be configured to detect the regularities between various users being redirected to this web resource and the presence (or, on the contrary, absence) of one and the same value pertaining to a certain parameter in all of those users.

For example, the processor 501 can be configured to detect a regularity being in the form of, e.g., «only the users located in the USA are to be redirected to this web resource» or, on the contrary, «only the users NOT located in the USA are to be redirected to this web resource».

In another example, with reference to FIG. 4A, the processor 501 can be configured to determine that the users that have gone to the first input web resource 105 from a device with a French-language operating system (OS) interface, are likely to be redirected to the web resource 121; those with a Spanish-language OS interface are likely to be redirected to the web resource 122, and the users with a Russian-language OS interface are likely to be redirected to the web resource 127. All other users have not been redirected, i.e., no redirect chains could be constructed for them.

In yet other example, the processor 501 can be configured to determine that the users entering the first input web resource 105 through browser A of v.1.0.1 are likely to be redirected to the web resource 121, whereas the users entering the first input web resource 105 using browser A of v.1.0.2 or higher are likely to be redirected to the web resource 122, and still those who entered the first input web resource 105 using any other browser are likely to be redirected to the web resource 127.

In some non-limiting embodiments of the present technology, the processor 501 can be configured to determine similarities or non-similarities in user behavior of the users using, e.g., by statistical analysis techniques.

Analyzing the user behavior vectors, similarly to the user parameter sets, the processor 501 can be configured to determine the dependencies between the fact of various users being redirected to a given web resource and the actions performed on the previous web resource, such as the selection of variants (sex: «M» or «F»), or the numerical values (age, ZIP code etc.) when filling out certain GUI elements, such as forms.

In the example of FIG. 4B, as a result of the analysis, e.g., the processor 501 can be configured to determine that the users who have specified the number belonging to a mobile operator "B" in the «Telephone» field while filling out the respective form on the web resource 127, are more likely to be redirected to the web resource 138, and those who specified the number belonging to a mobile operator "M", are more likely to be redirected to the web-resource 139.

In another example, the processor 501 can be configured to determine that the users who specified male gender while filling out the respective form on the web resource 127 are likely to be redirected to the web resource 138, and those who have specified female gender are more likely to be redirected to the web resource 139.

In every such case, the processor 501 can be configured to describe the identified regularity in formal lexical terms «IF—THEN» and save them in the database for each input web resource, for example, the first input web resource 105. To that end, the processor 501 can be configured to use, e.g., regular expressions.

It should be noted that, in some non-limiting embodiments of the present technology, for the further identifying target malicious web resource, only some of the identified regularities can be used, and not all of them. The regularities for the subsequent usage can be selected based on the preset incidence threshold exceedance condition. For example, the processor 501 can be configured to use a given regularity to determine the respective redirect rule only if the given regularity has been identified in at least 85% of the redirect chains 400 used for constructing the redirect graph 440.

When the analysis of all the web resources of the redirect graph 440 is completed, the identified regularities (all or the most frequent of them) are combined, thus obtaining a given redirect rule the plurality of redirect rules associated with the redirect graph 440. According to certain non-limiting embodiments of the present technology, the given rule can also be described in formal lexical terms, e.g.:

(IF the OS language is Russian, THEN redirect to web resource 127) AND (IF «Regional code \ TEF code» EQUALS_903_THEN redirect to web resource 138) . . . etc.

Further, in some non-limiting embodiments of the present technology, the processor 501 can be configured to save the so determined given redirect rule, for example, in the internal data repository 225. The processor 501 can be used any data entry format can be used; e.g., regular expressions.

In alternative non-limiting embodiments of the present technology, the processor 501 can be configured to save the identified redirect regularities not in the form of a redirect rule, but separately, —each regularity in a respective database field. For example, in the «OS language» field, the «Russian» or RU value can be saved; in the «Regional code \ TEF code» field, the 903 value can be saved etc.

The analysis results are saved in the internal data repository 225.

It should be noted that, in some non-limiting embodiments of the present technology, the so determined plurality of redirect rules can comprise three types of conditions, the fulfillment of which causes the traffic management system to redirect user from the given web resource to the next web resource in a given redirect chain:

conditions depending on the user parameters (e.g., as has been shown above, the English language of the operating system interface);
conditions depending on the user behavior vector (e.g., as has been shown above, choosing a certain gender in the poll);
conditions that depend both on the user parameters and the user behavior vector—e.g., as has been shown above, if the redirection to a certain web resource occurs when the conditions of both types are met.

Also, it should be noted that the steps 310-340 are described in the form of a linear sequence of actions for the purposes of simplicity and clarity of the present description. In various non-limiting embodiments of the present technology, the processor 501 can be configured to repeat these steps cyclically, including in a multithreading mode, receiving in every cycle a new link to at least one new input web resource. In this way, redirect graphs and redirect rules database can be formed containing the information and analysis results for the plurality of the malicious web resources examined as described above, the said database can further be stored, e.g., in the internal data repository 225.

Also, the processor 501 can additionally be configured to scan the Internet (including scanning the open websites containing information on the known malicious web resources), from time to time, find new references to the known malicious resources and process them as described above, updating the internal data repository 225.

Figure 3B:
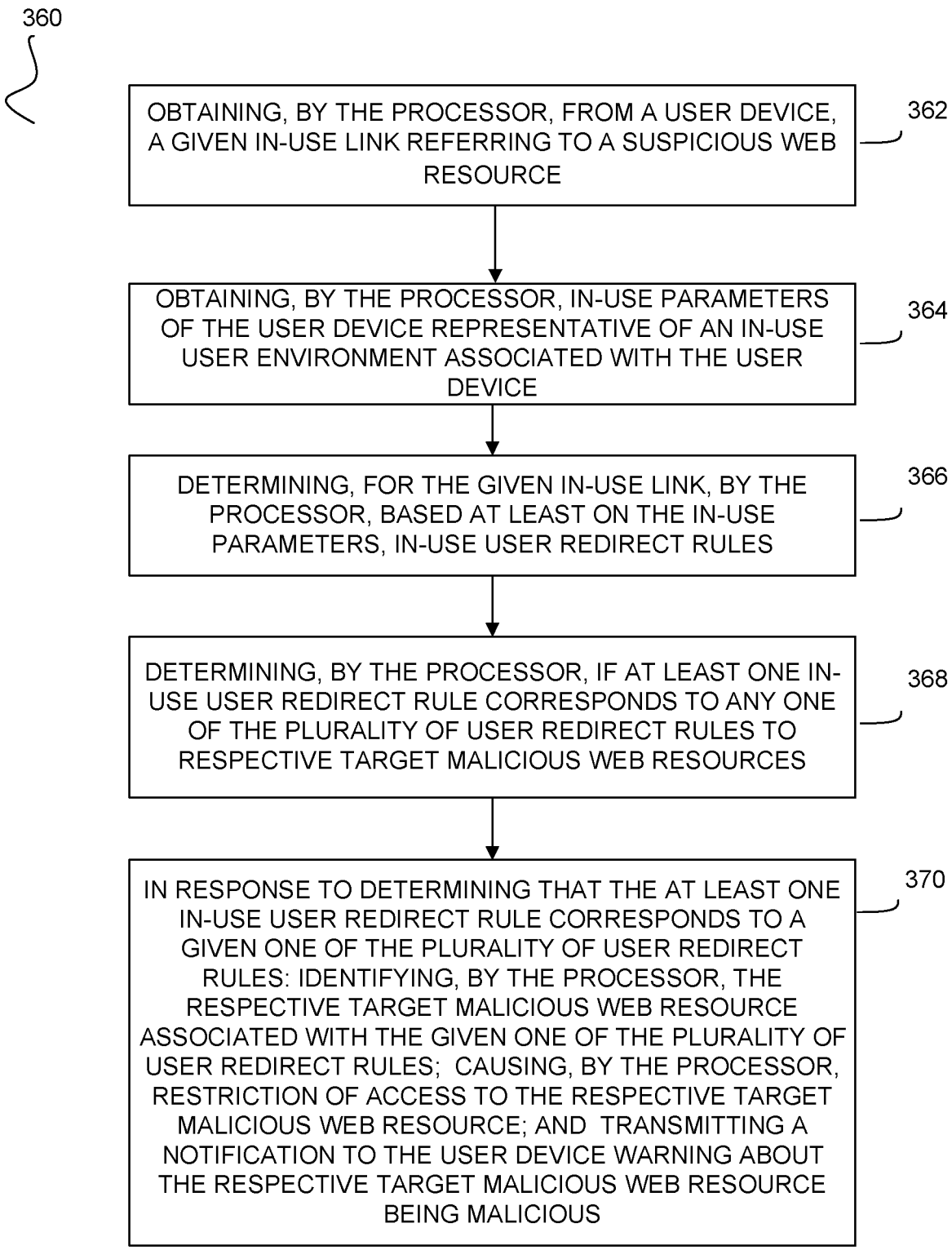

Thus, step 350 and the first stage 300 terminate; and the present method proceeds to the second stage 360, a flowchart of which is depicted in FIG. 3B, in accordance with certain non-limiting embodiments of the present technology.

Step 362: Obtaining, by the Processor, from a User Device, a Given In-Use Link Referring to a Suspicious Web Resource According to certain non-limiting embodiments of the present technology, the second stage 360 of the present method commences at step 362 with the processor 501 of the computing device 220 being configured to obtain, through the communication network 210, a given in-use link to at least one suspicious web resource. For example, the processor 501 can be configured to receive the given in-use link from one of the user devices 240-242.

The second stage hence advances to step 364.

Step 364: Obtaining, by the Processor, In-Use Parameters of the User Device Representative of an In-Use User Environment Associated with the User Device At step 364, in some non-limiting embodiments of the present technology, the processor 501 of the computing device 220 is configured to obtain information on the user environment from the given user device, such as one of the user devices 240, 241, 242. In the context of the present specification, the term "information on the user environment" denotes at least such data of the given user device as, without limitation, a user device IP address, a user device geolocation data, a manufacturer, a type, a model and version of the given user device, an operating system, a mobile connection provider, a browser version, a language of the operating system and browser interface, a system time, cookie files, a URL referrer (one of the client's request headers in the HTTP protocol containing the request source URL).

For example, in some non-limiting embodiments of the present technology, the processor 501 of the computing device 220 can receive this information from the User Agent that is used to determine the browser version, OS version and some of the installed add-ons versions; in cases where the User Agent is absent, the processor 501 can be configured to determine the browser version by checking for certain browser functions or features implemented or changed between the releases. In so doing, the processor 501 of the computing device 220 can also be configured to obtain the list of all the plugins, ActiveX controls and Browser Helper Objects (including their versions) installed in the user device 240-242 system. It should be noted that some of the plugins make their presence known through the HTTP headers.

Also, in some non-limiting embodiments of the present technology, the processor 501 of the computing device 220 can be configured to obtain the information on the installed extensions and other software associated with the browser from the given user device. For example, such software can comprise ad blockers introducing certain changes in the pages being browsed; using them, the processor 501 can be enabled to determine the extension type and settings. Such peculiarities are characteristic of all web applications—in particular, browsers installed on the device; they cannot be concealed through the privacy settings or any utilities.

In additional non-limiting embodiments of the present technology, the processor 501 of the computing device 220 can also be configured to obtain network protocol settings of the given user device including, e.g., without limitation, an external IP address of the given user device, outbound TCP/IP connections port numbers of the given user device, a local IP address for users located behind the NAT or HTTP proxy and information on the proxy servers used by the given user device that can be obtained, for example, from the HTTP header.

The second stage 260 hence advances to step 366.

Step 366: Determining, for the Given In-Use Link, by the Processor, Based at Least on the In-Use Parameters, In-Use User Redirect Rules After receiving the given in-use link to the at least one suspicious web resource from the given one of the user devices 240-242 and the parameters representative of the user environment thereof, according to certain non-limiting embodiments of the present technology, the processor 501 of the computing device 220 can be configured to determine in-use redirect rules from the at least one suspicious web resource. By doing so, the processor 501 can be configured to determine if a redirection to at least one target malicious web resource, such as the target web resource 194, from the at least one suspicious web resource is possible.

To that end, according to certain non-limiting embodiments of the present technology, based on the obtained data, the processor 501 can be configured to retrieve, for example, from the internal data repository 225, the user profiles having user parameters closest to the user environment parameters obtained from the real user device.

For example, if the information concerning, in particular, the fact that the user device geolocation data corresponds to the USA, its operating system and browser language is English and the browser A version is 1.0.1 has been obtained from the given user device as part of the user environment parameters thereof, the processor 501 can be configured to submit an inquiry to the internal date repository 225 including these parameters.

In response, according to some non-limiting embodiments of the present technology, the processor 501 of the computing device 220 can be configured to retrieve and further use all the found user profiles (sets of parameter representative thereof) with at least one matching preset parameter. In other non-limiting embodiments of the present technology, the processor 501 can be configured to use only those retrieved user profiles whose parameters correspond to the determined parameters of the user environment associated with the given user device (i.e., according to the given example, both interface language, geolocation data and browser version). Any other principles of the user profiles selection (resembling the environment parameters obtained from the real user device) are envisioned as well, without limitations. For example, the interface language and geolocation data matches could be considered mandatory, and the matching of at least one other parameter can be optional.

Further, according to certain non-limiting embodiments of the present technology, using the identifier of each of the so identified user profiles as respective search queries, the processor 501 can be configured to: (i) retrieve, from the internal data repository 225, information on various previously constructed redirect graphs, and (ii) identify, based on the given redirect graph, such as the redirect graph 440 described above, respective user behavior vectors used for constructing the redirect graph 440.

Further, according to certain non-limiting embodiments of the present technology, the processor 501 can be configured to (i) retrieve the so identified user behavior vectors; and (ii) generate "a given user profile—the respective user behavior vector" to determine controllable runtime environment parameters, e.g., the parameters of the virtual machine imitating the given user device, as has described above with regard to step 320 of the first stage 300.

Further, using the so determined controllable runtime environment parameters, the respective user behavior vector associated with the given user profile, the processor 501 can be configured to visit the at least one suspicious web resources, the given in-use link for which was obtained at step 362.

In alternative non-limiting embodiments of the present technology, the user behavior vectors successfully applied in the past are not searched for, but all the user behavior vectors present in the internal data repository 225 are used with the suitable user profiles (parameters).

It should be noted that, in some non-limiting embodiments of the present technology, the computing device 220 can be configured to simultaneously launch several controllable runtime environments, each of which can be fine-tuned using the retrieved user profile parameters. Thus, the transitions to the at least one suspicious input web resource following the obtained in-use link thereof can be executed simultaneously for various «user profile—user behavior vector» pairs.

Thus, in some non-limiting embodiments of the present technology, based on the respective user behavior vectors and the given in-use link, the processor 501 can be configured to determine at least one in-use redirect chain, in a similar fashion as described above with respect to step 330 of the first stage 300.

In other non-limiting embodiments of the present technology, the processor 501 can be configured to search for the given in-use link (e.g., URL) to the at least one suspicious input web resource obtained at step 362 in the redirect graph database, that is in the internal data repository 225.

Such search can be both, for identifying an exact and fuzzy match for the obtained URL. In the case of the fuzzy matching, the processor 501 can be configured to identify, for example, at least one of the following matches:

of all parts of the URL address, except for a top-level domain, of the top-level domain names;

of the lengths of the domain name, of the top-level domain name, of the page names and of the parameter names; and of the IP address.

If the input web resource corresponding to the specified search query is present in the database, the processor 501 can be configured to retrieve at least one user redirect rule associated with the at least one suspicious web resource from the database.

The previously identified and saved in the database redirect regularities forming the retrieved redirect rule are used for an appropriate configuring of the controllable runtime environment, e.g., a virtual machine simulating the given user device. Using the virtual machine configured in this way, the processor 501 can be configured to simulate a transition to the at least one suspicious web resource, and further determine the at least one in-use redirect chain in a similar fashion as described above with respect to step 330.

Further, the processor 501 can be configured to store the so determined at least one in-use redirect chain in the database of the internal data repository 225, for example. It is also clear that when several different user profiles and/or user behavior vectors are used at this step, more than one redirect chain can be obtained.

However, if the processor 501 could not construct any in-use redirect chain for any of the found user parameter variants, i.e., the at least one suspicious web resource the given in-use link to which has been obtained at step 362 does not implement a multi-step fraudulent scheme at the given user parameters, the processor 501 can be configured to determine that the at least one suspicious web resource is safe for the user. In this regard, the processor 501 can be configured to transmit, to the given user device, a respective notification to the user of the given user device that the given in-use link is safe to follow. At this, the present method may terminate.

The second stage 360 thus proceeds to step 368.

Step 368: Determining, by the Processor, if at Least One In-Use User Redirect Rule Corresponds to any One of the Plurality of User Redirect Rules to Respective Target Malicious Web Resources At step 368, the processor 501 can be configured to determine if the at least one in-use redirect chain includes redirections corresponding to those that have been previously identified during the first stage 300 that lead to the at least one target malicious resources, such as the target web resource 194.

More specifically, the processor 501 can be configured to (i) determine, for every redirect chain of the at least one in-use redirect chain, detected and saved in the data repository 225 at step 366, a respective number of redirects (i.e., the edges in this chain); and (ii) compare the respective number of redirects with a predetermined redirect threshold value. For example, if an average chain length of a given one of the at least one in-use redirect chains exceeds the predetermined redirect threshold value (e.g., equaling 6 redirects), the processor 501 can be configured to determine that this redirect chain is malicious. The processor 501 can further be configured to safe this information in the internal data repository 225.

In contrast, if the respective number of redirects in the given in-use redirect chain does not exceed the predetermined redirect threshold value (e.g., equaling 2 or 4), the processor 501 can be configured to determine that the given in-use redirect chain is benign and thus exclude the given in-use redirect chain from further processing. It is believed that a small number of redirects is not typical for malefactors; more likely, it can be indicative of legal web resource actions, e.g., promotional campaigns.

If, based on the number of redirects, the processor 501 has excluded each one of the at least one in-use redirect chain determined at step 368 from further processing, the processor 501 can further be configured to determine that the at least one suspicious web resource is safe. Further, the processor 501 can be configured to generate and transmit a respective notification for the user of the given user device. At this, the present method may be completed.

Alternatively, if the number of redirects exceeds the predetermined redirect threshold value in the given in-use chain, according to certain non-limiting embodiments of the present technology, the processor 501 can be configured to determine a respective set of in-use redirect rules associated (or, otherwise the set of conditions for redirecting from one web resource to another). As it can be appreciated, the processor 501 can be configured to determine the respective set of in-use redirect rules in a similar manner as described above at step 350 of the first stage 300.

Also, in some non-limiting embodiments of the present technology, the processor 501 can be configured to construct, based on each one of the at least one in-use redirect chain, the respective number of redirects of which exceeds the predetermined redirect threshold value, an in-use redirect graph, as has been described above at step 340 of the first stage 300.

The second stage hence advances to step 370.

Step 370: In Response to Determining that the at Least One In-Use User Redirect Rule Corresponds to a Given One of the Plurality of User Redirect Rules: Identifying, by the Processor, the Respective Target Malicious Web Resource Associated with the Given One of the Plurality of User Redirect Rules; Causing, by the Processor, Restriction of Access to the Respective Target Malicious Web Resource; and Transmitting a Notification to the User Device Warning about the Respective Target Malicious Web Resource being Malicious At step 370, according to certain non-limiting embodiments of the present technology, the processor 501 can be configured to determine if a given in-use redirect rule of the in-use redirect graph matches with any one of known redirect rules identified at the first stage 300. To that end, according to certain non-limiting embodiments of the present technology, the processor 501 can be configured to submit a respective inquiry to the database containing the plurality of redirect graphs identified at step 350*m* of the first stage 300. Further, the processor 501 can be configured to compare the given in-use redirect rule with each one of the plurality of redirect rules determined at the first stage 300 by using either one of at a time or in a multithreading mode.

Further, if the processor 501 determines that the given in-use redirect rule matches a respective one of the plurality of redirect rules determined at the first stage 300, the processor 501 can be configured to determine that the at least one suspicious web resource obtained at step 362 as being part of a multi-step fraudulent Internet scheme, and hence malicious.

If no matches have been identified, in some non-limiting embodiments of the present technology, the processor 501 can be configured to perform additional checks for whether one of the web resources that is part of the at least in-use one redirect chain is a known malicious web resource. To that end, in some non-limiting embodiments of the present technology, the processor 501 can be configured to search the database containing the list of the known malicious web resources and the redirect graphs' and redirect rules database determined at the first stage 300, as it was described above with respect to FIG. 3A. If the processor 501 determines that the given in-use redirect chain includes a malicious web resource, the processor 501 can further be configured to determine that the given in-use redirect chain is malicious, information of which the processor 501 can further be configured to save in the internal data repository 225.

Those skilled in the art are well aware of other technologies and methods for the detection of the web resources' malicious nature, e.g., by analyzing the URL addresses by the URL masks and the domain names—by key words. The checkups can also be conducted by identifying the fact of the loading by the examined pages of the original websites content, by checking for the presence of the images related to a certain brand (e.g., for names and logos of banks, payment systems, resources, websites, services etc.) or by checking the web resource track record. Such methods and technologies of counteracting phishing, Internet fraudulence and illegal access to the users (web page visitors or application (including mobile applications) users)' confidential information and, in particular, the methods and technologies for the phishing web pages detection can additionally involve the detection of the domain name registration date (and also of its expiration date). The checkups built on calculation of the hash function values obtained from the web pages and their comparison with the previously calculated values are also envisioned.

Also, at this step, in additional non-limiting embodiments of the present technology, the processor 501 can be configured to determine other attributes of the given in-use redirect chain that can be indicative of the maliciousness of the given in-use redirect chain.

Such attributes can include, without limitation, at least one of:
- exact or almost exact matching of the examined web resource page text with the text contained in the known malicious web pages; such attributes are identified by performing a search (using any of the commonly known methods) for the examined web page text in the malicious web pages' text databases prepared beforehand.
- intermediary web resources properties characteristic of the malicious web resources;
- a length and structure of the URLs used in every redirect chain, including the length and structure of the domain names that are part of the URL.

For example, by analyzing the properties of the intermediary web pages (such as web pages 121, 122, 127, 135, 138 etc.), e.g., the geographical location of the servers hosting those pages, the processor 501 can be configured to determine whether they are the same for different resources. Further, if it has been determined, e.g., that all the web resources have a different geographical location, e.g., located in different countries and not within one country, the given in-use redirect chain is suspected to be malicious.

By analyzing the lengths of the links used for the navigation from one web resource to another and located in one vertex, as well as the lengths of the domain names constituting such links, the processor 501 can be configured to determine whether a majority of the links in the given in-use redirect chain have the same or similar length. If so, the processor 501 can be configured to determine the given in-use redirect chain as being malicious, as well.

Thus, if the processor 501 has determined that the given in-use redirect rule matches the respective one of the plurality of redirect rules identified at the first stage 300, according to certain non-limiting embodiments of the present technology, the processor 501 can further be configured to identify a respective target web resource associated with the given in-use redirect rule, that is, the web resource, to which the user of the given user device can be redirect in accordance with the given in-use redirect rule.

The same actions are performed if no correspondence with the known redirect rules has been detected, but the length of the redirect chain exceeds the preset threshold value, and, based on the results of the totality of various checkups described above, it has been established that at least one web resource in the given in-use redirect chain is malicious. This condition corresponds to the case when new, previously unknown multi-stage fraudulent Internet scheme has been detected.

In one non-limiting example, a given web checkup can comprise determining if a given web resource contains a suggestion to input bank card details. In another non-limiting example, the criterion of the web resource belonging to the target web resources can comprise the suggestion to append the scanned image of the passport or the driver's license. The processor 501 can be configured to execute such checkups, e.g., by analyzing the HTML code of the given web resource and/or by identifying the key words and data input fields in this code that can be indicative of the GUI elements (such as the fields for the bank card details and the like) associated with the maliciousness of the given web resource.

In some non-limiting embodiments of the present technology, the processor 501 can be configured to determine if the given in-use redirect chain ends, i.e., the target web resource detection can be implemented based on the analysis of the HTTP response codes obtained by the browser during the construction of the given in-use redirect chain. For example, when after at least three redirections the processor 501 stops receiving HTTP responses containing codes of the 301, 302, 303, 304 or 307 type, the processor 501 can be configured to determine that no redirections are effected from the current web page and, therefore, the current web page comprises the target web resource.

Further, according to certain non-limiting embodiments of the present technology, if the processor 501 has identified at least one target malicious web resource, the processor 501 can be configured to (i) restrict access to the at least one target malicious web resource; and (ii) transmit a respective warning notification for the user of the given user device.

For example, in various non-limiting embodiments of the present technology, the processor 501 can be configured to block access to the target malicious web resource by executing at least one of:
- blocking of all intermediary web resources and the respective target web resource of the given in-use redirect chain;
- adding all the intermediary web resources and the respective target web resource into malicious resources databases;
- collecting body of evidence in support of fraudulent actions of the respective target web resource;
- identifying affiliations with all the intermediary web resources and the respective target web resource;
- determining a legal measures to be imposed on the respective target web resource, including on its owner, by using the automatically generated claim templates for sending them to the authorized bodies, as an example;
- notifying users on the web resource maliciousness through the output warnings and explanatory reports.

The response measures can differ depending on the target network resource affiliation, its localization, the brand that it's using, the persons whose rights are violated by the fraudulent resource, its subject matter etc.

The second stage 360 and the present method thus terminate.

Computing Environment

Figure 5:
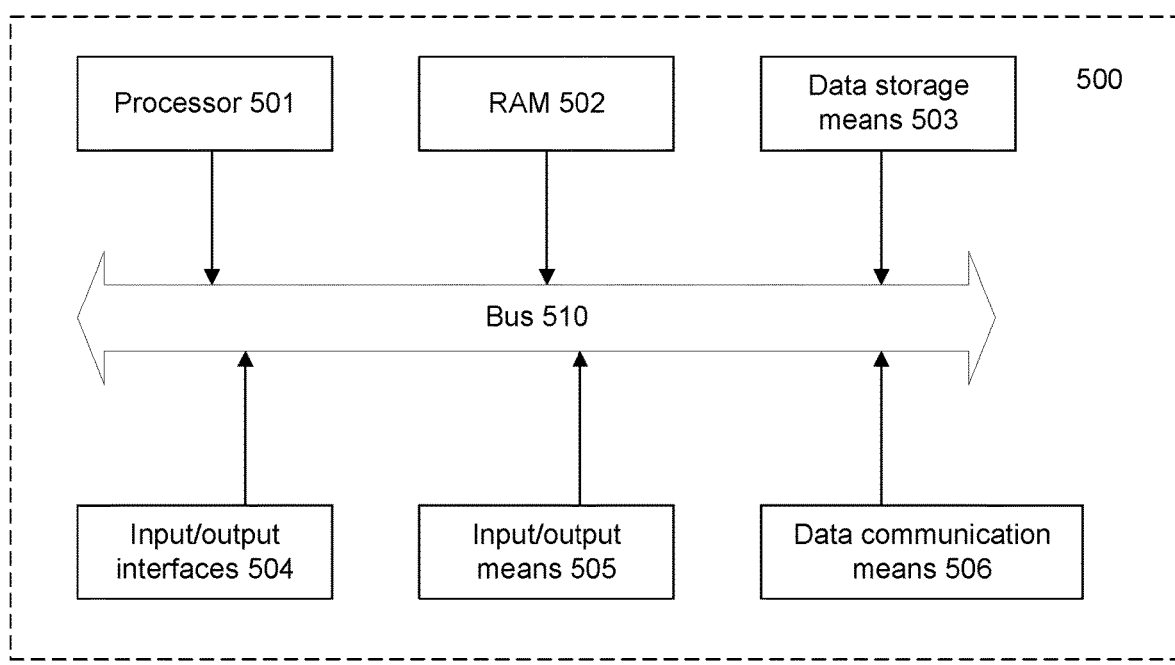
FIG. 5 depicts a schematic diagram of an example computing environment configurable for execution of the present method of FIGS. 3A and 3B, in accordance with certain non-limiting embodiments of the present technology.

With reference to FIG. 5, there is depicted an example functional diagram of the computing environment 500 configurable to implement certain non-limiting embodiments of the present technology including the first and second stages 300 and 360 of the present method described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the first and second stages 300 and 360 of the present method described above.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS532, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 506 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method for identifying target malicious web resources, the method being executable by a computing device including at least one processor, the method comprising:

during a first stage:
  obtaining a given link of a plurality of links, the given link referring to an initial malicious web resource;
  retrieving, from a database communicatively coupled to the at least one processor, simulated user parameters indicative of a simulated user environment and at least one user behavior vector including values indicative of simulated user actions with the initial malicious web resource;
  based on the simulated user parameters and the simulated user actions, determining at least one redirect chain, a given one of the at least one redirect chain including web resources defining a transition sequence from the initial malicious web resource to a respective target malicious web resource,
    the respective target malicious web resource being a last web resource in the at least one redirect chain; and
    the initial malicious web resource and the respective target malicious web resource being associated with different web servers;
  generating, based on the at least one redirect chain, a redirect graph; and
  analyzing the redirect graph to determine a plurality of user redirect rules, a given user redirect rule including data of a respective transition from the initial malicious web resource towards the respective target malicious web resource associated with a respective simulated user action and at least some of the simulated user parameters;
during a second stage following the first stage:
  obtaining, from a user device, a given in-use link referring to a suspicious web resource;
  obtaining in-use parameters of the user device representative of an in-use user environment associated with the user device;
  determining, for the given in-use link, based at least on the in-use parameters, in-use user redirect rules,
    a given in-use user redirect rule being representative of a respective transition from the suspicious web resource;
  determining if at least one in-use user redirect rule corresponds to any one of the plurality of user redirect rules that is configured for redirecting to respective target malicious web resources;
  in response to determining that the at least one in-use user redirect rule corresponds to a given one of the plurality of user redirect rules:
    identifying the respective target malicious web resource associated with the given one of the plurality of user redirect rules;
    causing restriction of access to the respective target malicious web resource; and
    transmitting a notification to the user device warning about the respective target malicious web resource being malicious.

2. The method of claim 1, wherein the given link includes at least one of: a domain name, an Internet Protocol (IP) address, and a Universal Resource Locator (URL) address.

3. The method of claim 1, wherein the simulated user actions of the at least one user behavior vector comprise at least one of: following a link, entering data, selecting from suggested options.

4. The method of claim 1, wherein the simulated user parameters comprise parameters of a simulated user device further including at least one of: an IP address, geolocation data, a redirection time, information, a type of an operating system, an operating system interface language, a connection provider, a browser, a browser version, a browser interface language, cookie files, system time and actual time in the user device system, a URL-referrer.

5. The method of claim 1, further comprising retrieving additional information about each intermediary web resource identified in the given one of the at least one redirect chain, the additional information including at least one of:
- a URL link referring to a given intermediary web resource,
- an Identity Document (ID) and other parameters within a body of the URL link;
- Detection time and date;
- geolocation data associated with the given intermediary web resource;
- Information about a hosting provider associated with the given intermediary web resource;
- an ID, an owner company name, and a brand name associated with the given intermediary web resource.

6. The method of claim 1, further comprising considering all redirect chains, determined based on respective ones of the plurality of links, to generate the redirect graph, wherein a given redirect chain of the redirect chains includes at least one of: a respective user behavior vector further including the simulated user parameters used for determining the given redirect chain, about each web resource contained therein, and about the sequence of the said web resources.

7. The method of claim 1, wherein the redirect graph comprises a plurality of nodes joined thereamong by edges, and wherein a given node is representative of a respective web resource, and a given edge is representative of a respective transition from one web resource to an other web resource.

8. The method of claim 1, wherein the generating the redirect graph comprises identifying affiliated web resources, the identifying being executed based on meeting at least one condition including:
- links to candidate affiliated web resources including URL addressees, domain names, page names, and parameter names, match;
- lengths of domain name, lengths of top-level domain name, lengths of page names and parameter names of the candidate affiliated web resources match; and
- IP addresses of the candidate affiliated web resources match.

9. The method of claim 8, wherein the affiliated web resources are represented by a single vertex of the redirect graph.

10. The method of claim 1, wherein the generating the redirect graph comprises comparing web resources among the redirect chains, and wherein:
- if matching web resources are identified in more than one chain, the method further comprises generating a single vertex representative of the matching web resources in the redirect graph;
- if a given web resource is different from all other web resources identified in the redirect chains, the method further comprises generating a respective new vertex for the given web resource in the redirect graph; and wherein if no edge exists in the redirect graph connecting the respective new vertex with previous vertices, the method further comprises generating a respective edge extending from the respective new vertex.

11. The method of claim 1, wherein the respective target malicious web resource is identified through additional checks thereof for malicious activities.

12. The method of claim 1, wherein the respective target malicious web resource is identified by analyzing a Hyper-Text Transfer Protocol (HTTP) response codes obtained by a browser application.

13. The method of claim 1, further comprising rejecting the given one of the at least one redirect chain from inclusion thereof in the redirect graph if the given one of the at least one redirect chain includes less than a pre-determined number of transitions between web resources contained therein.

14. The method of claim 1, wherein user behavior vectors are used both during the first stage and the second stage for determining respective redirect chains.

15. The method of claim 1, wherein the determining, for the given in-use link, the in-use redirect rules comprise:
- retrieving, from the database, based on the in-use user parameters, an in-use user behavior vector including values indicative of at least one simulated user action with the given in-use link; and
- determining the in-use redirect rules based on the at least one simulated user action with the given in-use link.

16. The method of claim 1, further comprising storing data indicative of the redirect graph in a redirect graph database communicatively coupled to the at least one processor.

17. The method of claim 16, wherein the determining, for the given in-use link, the in-use redirect rules comprises:
- retrieving, from the redirect graph database, data indicative of redirect graphs corresponding to the given in-use link; and
- determining the in-use rules based on the redirect graphs corresponding to the given in-use link.

18. The method of claim 1, wherein the given user redirect rule towards the respective target malicious web resource comprises data indicative of at least one of:
- conditions of the respective transition to a next web resource including the simulated user parameters;
- conditions of the respective transition to the next web resource including the simulated user actions; and
- conditions of the respective transition to the next web resource including both the simulated user parameters and the simulated user actions.

19. A computer-implementable method for identifying malicious web resource, the method being executable by a computing device including at least one processor, the method comprising:
- obtaining, from a user device, a given link referring to a suspicious web resource;
- obtaining parameters of the user device representative of a user environment associated with the user device;
- determining, based on the parameters, at least one redirect chain, the at least one redirect chain including a plurality of web resources defining a transition sequence from the suspicious web resource;
- determining, based on the at least one redirect chain, user redirect rules, a given user redirect rule of the plurality of user redirect rules being representative of a respective transition from the suspicious web resource;
- determining if at least one in-use user redirect rule corresponds to any one of a plurality of predetermined user redirect rules;
- in response to determining that the at least one user redirect rule corresponds to a given one of the plurality of predetermined user redirect rules:
  - identifying a respective target malicious web resource associated with the given one of the plurality of predetermined user redirect rules, the respective target malicious web resource being a last web resource in the at least one redirect chain; and the suspicious web resource and the respective target malicious web resource being associated with different web servers;

causing restriction of access, from the user device, to the respective target malicious web resource; and transmitting a notification to the user device warning about the respective target malicious web resource being malicious.

20. A computing device for identifying target malicious web resources, the computing device comprising at least one processor and a non-transitory computer-readable medium storing instructions, which, when executed by the at least one processor, cause the computing device to:

during a first stage:

obtain a given link of a plurality of links, the given link referring to an initial malicious web resource;

retrieve, from a database communicatively coupled to the processor, simulated user parameters indicative of a simulated user environment and at least one user behavior vector including values indicative of simulated user actions with the initial malicious web resource;

based on the simulated user parameters and the simulated user actions, determine at least one redirect chain, a given one of the at least one redirect chain including web resources defining a transition sequence from the initial malicious web resource to a respective target malicious web resource, the respective target malicious web resource being a last web resource in the at least one redirect chain; and the initial malicious web resource and the respective target malicious web resource being associated with different web servers;

generate, based on the at least one redirect chain, a redirect graph; and analyze the redirect graph to determine a plurality of user redirect rules, a given user redirect rule including data of a respective transition from the initial malicious web resource towards the respective target malicious web resource associated with a respective simulated user action and at least some of the simulated user parameters;

during a second stage following the first stage:

obtain, from a user device, a given in-use link referring to a suspicious web resource;

obtain in-use parameters of the user device representative of an in-use user environment associated with the user device;

determine, for the given in-use link, based at least on the in-use parameters, in-use user redirect rules, a given in-use user redirect rule being representative of a respective transition from the suspicious web resource;

determine if at least one in-use user redirect rule corresponds to any one of the plurality of user redirect rules that is configured for redirecting to respective target malicious web resources;

in response to determining that the at least one in-use user redirect rule corresponds to a given one of the plurality of user redirect rules:

identify the respective target malicious web resource associated with the given one of the plurality of user redirect rules;

cause restriction of access to the respective target malicious web resource; and transmit a notification to the user device warning about the respective target malicious web resource being malicious.

21. A computer-implementable method for identifying target malicious web resources, the method being executable by a computing device including at least one processor, the method comprising:

during a first stage:

obtaining a given link of a plurality of links, the given link referring to an initial malicious web resource;

retrieving, from a database communicatively coupled to the at least one processor, simulated user parameters indicative of a simulated user environment and at least one user behavior vector including values indicative of simulated user actions with the initial malicious web resource;

based on the simulated user parameters and the simulated user actions, determining at least one redirect chain, a given one of the at least one redirect chain including web resources defining a transition sequence from the initial malicious web resource to a respective target malicious web resource;

generating, based on the at least one redirect chain, a redirect graph by identifying affiliated web resources, the identifying being executed based on meeting at least one condition selected from the group consisting of:

links to candidate affiliated web resources including URL addressees, domain names, page names, and parameter names match;

lengths of domain name, lengths of top-level domain name, lengths of page names and parameter names of the candidate affiliated web resources match; and IP addresses of the candidate affiliated web resources match; and analyzing the redirect graph to determine a plurality of user redirect rules, a given user redirect rule including data of a respective transition from the initial malicious web resource towards the respective target malicious web resource associated with a respective simulated user action and at least some of the simulated user parameters;

during a second stage following the first stage:

obtaining, from a user device, a given in-use link referring to a suspicious web resource;

obtaining in-use parameters of the user device representative of an in-use user environment associated with the user device;

determining, for the given in-use link, based at least on the in-use parameters, in-use user redirect rules, a given in-use user redirect rule being representative of a respective transition from the suspicious web resource;

determining if at least one in-use user redirect rule corresponds to any one of the plurality of user redirect rules that is configured for redirecting to respective target malicious web resources;

in response to determining that the at least one in-use user redirect rule corresponds to a given one of the plurality of user redirect rules:

identifying the respective target malicious web resource associated with the given one of the plurality of user redirect rules;

causing restriction of access to the respective target malicious web resource; and transmitting a notification to the user device warning about the respective target malicious web resource being malicious.

22. A computer-implementable method for identifying target malicious web resources, the method being executable by a computing device including at least one processor, the method comprising:

during a first stage:

obtaining a given link of a plurality of links, the given link referring to an initial malicious web resource;

retrieving, from a database communicatively coupled to the at least one processor, simulated user parameters indicative of a simulated user environment and at least one user behavior vector including values indicative of simulated user actions with the initial malicious web resource;

based on the simulated user parameters and the simulated user actions, determining at least one redirect chain, a given one of the at least one redirect chain including web resources defining a transition sequence from the initial malicious web resource to a respective target malicious web resource;

generating, based on the at least one redirect chain, a redirect graph by comparing web resources among the at least one redirect chain, the comparing comprising:

in response to matching web resources being identified in more than one chain, generating a single vertex representative of the matching web resources in the redirect graph;

in response to a given web resource being different from all other web resources identified in the at least one redirect chain, generating a respective new vertex for the given web resource in the redirect graph; and in response no edge existing in the redirect graph connecting the respective new vertex with previous vertices, generating a respective edge extending from the respective new vertex; and analyzing the redirect graph to determine a plurality of user redirect rules, a given user redirect rule including data of a respective transition from the initial malicious web resource towards the respective target malicious web resource associated with a respective simulated user action and at least some of the simulated user parameters;

during a second stage following the first stage:

obtaining, from a user device, a given in-use link referring to a suspicious web resource;

obtaining in-use parameters of the user device representative of an in-use user environment associated with the user device;

determining, for the given in-use link, based at least on the in-use parameters, in-use user redirect rules, a given in-use user redirect rule being representative of a respective transition from the suspicious web resource;

determining if at least one in-use user redirect rule corresponds to any one of the plurality of user redirect rules that is configured for redirecting to respective target malicious web resources;

in response to determining that the at least one in-use user redirect rule corresponds to a given one of the plurality of user redirect rules:

identifying the respective target malicious web resource associated with the given one of the plurality of user redirect rules;

causing restriction of access to the respective target malicious web resource; and transmitting a notification to the user device warning about the respective target malicious web resource being malicious.

\* \* \* \* \*